US011598943B2

(12) United States Patent
Heine et al.

(10) Patent No.: US 11,598,943 B2
(45) Date of Patent: Mar. 7, 2023

(54) FLUORESCENCE MICROSCOPE WITH STABILIZED ADJUSTMENT AND GROUP OF COMPONENTS AND MODULE FOR UPGRADING A FLUORESCENCE MICROSCOPE

(71) Applicant: Abberior Instruments GmbH, Goettingen (DE)

(72) Inventors: Joern Heine, Witzenhausen (DE); Haugen Mittelstaedt, Bovenden (DE); Matthias Reuss, Goettingen (DE); Gerald Donnert, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 193 days.

(21) Appl. No.: 17/106,365

(22) Filed: Nov. 30, 2020

(65) Prior Publication Data

US 2021/0165199 A1    Jun. 3, 2021

(30) Foreign Application Priority Data

Nov. 29, 2019    (DE) ...................... 10 2019 008 304.0

(51) Int. Cl.
*G02B 21/00*    (2006.01)
*G01N 21/64*    (2006.01)
*G02B 21/36*    (2006.01)

(52) U.S. Cl.
CPC ..... *G02B 21/0076* (2013.01); *G01N 21/6458* (2013.01); *G02B 21/361* (2013.01)

(58) Field of Classification Search
CPC .. G02B 21/0076; G02B 21/361; G02B 21/00; G02B 21/0004; G02B 21/002;
(Continued)

(56) References Cited

U.S. PATENT DOCUMENTS 6,914,236 B2    7/2005    Hoffmann
7,009,161 B2    3/2006    Hoffmann
(Continued)

FOREIGN PATENT DOCUMENTS

CN    108303806    7/2018
DE    10063276 A1    7/2002
(Continued)

OTHER PUBLICATIONS

Van Dort, Joris; "Aberation Correction in STED Microscopy", Georg-August-Universitaet Goettingen, Oct. 2018 (74 Pages).
(Continued)

*Primary Examiner* — Arnel C Lavarias
(74) *Attorney, Agent, or Firm* — Thomas | Horstemeyer, LLP

(57) ABSTRACT

A fluorescence microscope (10) includes a sample illumination beam path including a source (9) for illumination light, a first wave front modulator (24) for providing the focused illumination light (8) with a central intensity minimum, a beam splitter (26) and a second adjustable wave front modulator (34) arranged in a pupil plane (30) of an objective (20). A first detection beam path section including the second wave front modulator (34) and a telescope (11) and ending at the beam splitter (26) coincides with the sample illumination beam path. A separate second detection beam path section includes a detector (38) for luminescence light from a sample. The telescope (11) images a first pupil (31) formed in the pupil plane (30) in a smaller second pupil (32), and transfers a beam of the illumination light (8) collimated in the second pupil (32) into an expanded beam collimated in the first pupil (31).

20 Claims, 11 Drawing Sheets

(58) Field of Classification Search
CPC .......... G02B 21/0024; G02B 21/0032; G02B 21/0036; G02B 21/0052; G02B 21/006; G02B 21/0072; G02B 21/06; G02B 21/36; G01N 21/6458; G01N 21/6456; G01N 2021/6463
USPC ....... 359/368, 362, 363, 369, 385, 387, 388, 359/389, 390
See application file for complete search history.

(56) References Cited

U.S. PATENT DOCUMENTS

| | | | |
|---|---|---|---|
| 7,633,053 B2 | 12/2009 | Wolleschensky et al. | |
| 9,291,562 B2 | 3/2016 | Hell | |
| 9,575,302 B2 | 2/2017 | Booth et al. | |
| 10,063,276 B2 | 8/2018 | Tomeba et al. | |
| 2005/0068614 A1* | 3/2005 | Yoneyama | G02B 21/245 359/383 |
| 2006/0049343 A1 | 3/2006 | Wolleschensky et al. | |
| 2013/0278744 A1* | 10/2013 | Debarre | G02B 21/06 348/79 |
| 2014/0029978 A1 | 1/2014 | Mogi | |
| 2014/0368904 A1 | 12/2014 | Moertelmaier et al. | |
| 2015/0076333 A1 | 3/2015 | Guillon et al. | |
| 2015/0219886 A1* | 8/2015 | Wartmann | G02B 21/361 359/368 |
| 2015/0338639 A1 | 11/2015 | Matsumoto et al. | |
| 2019/0195800 A1 | 6/2019 | Heine et al. | |
| 2019/0196172 A1 | 6/2019 | Hillman | |
| 2019/0258053 A1 | 8/2019 | Hattori et al. | |

FOREIGN PATENT DOCUMENTS

| | | |
|---|---|---|
| DE | 102011055367 A1 | 5/2013 |
| DE | 112012005960 T5 | 11/2014 |
| EP | 1372011 A2 | 12/2003 |
| EP | 1617251 A1 | 1/2006 |
| JP | H11326860 A | 11/1999 |
| JP | 2004341394 A | 12/2004 |
| WO | 2014029978 A1 | 2/2014 |
| WO | 2018042056 A1 | 3/2018 |

OTHER PUBLICATIONS

Extended European Search Report in co-pending,related EP Application No. 20210326.3, dated Jul. 9, 2021.
Lenz, Martin O. et al. "3-D stimulated emission depletion microscopy with programmable aberration correction", J. Biophotonics 7, No. 1-2, 29-36 (2014).
Heine, Jörn Dissertation "Intelligent-Illumination STED", Göttingen 2017.
Balzarotti, Francisco et al. "Nanometer resolution imaging and tracking of fluorescent molecules with minimal photon fluxes", arXiv:1611.03401 [physics.optics] (2016); inclusive of the supplemental material, published in Science, vol. 355, Issue 6325, 606-612 (2017).
Gwosch, Klaus C. et al. "MINFLUX nanoscopy delivers multicolor nanometer 3D-resolution in (living) cells" published on the Preprint Server bioRxiv in Aug. 2019 (doi: http://dx.doi.org/10.1101/734251).
Rueckel, M. et al. "Adaptive wavefront correction in two-photon microscopy using coherence-gated wavefront sensing", PNAS, vol. 103, No. 46, 17137-17142 (2006).
Gould, Travis J. et al. "Adaptive optics enables 3D Sted microscopy in aberrating specimens"; Optics Express, vol. 20, No. 19, 20999-21009 (2012).
Pal, Sourav et al. "Stabilization of pupils in a zoom lens with two independent movements", Appl. Opt. 52, 5611-5618 (2013).

* cited by examiner

FLUORESCENCE MICROSCOPE WITH STABILIZED ADJUSTMENT AND GROUP OF COMPONENTS AND MODULE FOR UPGRADING A FLUORESCENCE MICROSCOPE

CROSS REFERENCE TO RELATED APPLICATIONS

This application claims priority to co-pending German Patent Application No. DE 10 2019 008 304.0 entitled "Fluoreszenzmikroskop mit stabilisierter Justage and Baugruppe sowie Modul zur Aufrustung eines Fluoreszenzmikroskops" and filed on Nov. 29, 2019.

FIELD OF THE INVENTION

The invention generally relates to scanning fluorescence microscopy and more particularly to confocal laser scanning fluorescence microscopy for three-dimensional imaging. This technical field includes fluorescence microscopes for confocal fluorescence microscopy, STED microscopy and MINFLUX microscopy.

BACKGROUND OF THE INVENTION

An active transmissive phase modulation element and a microscope comprising an objective and such a phase modulation element are known from United States patent application publication US 2015/0 338 639 A1. The phase modulation element is arranged perpendicular to the optical axis in a plane of a pupil which is provided by imaging the back aperture of the objective by means of a relay optics because the back aperture of the objective is generally not accessible as such. The phase modulation element is located in a beam path section which both belongs to an illumination beam path and to a detection beam path. Thus, both collimated illumination light and light emitted out of the sample and collected by the objective pass through the modulation element which modifies the phase of the illumination light for correcting sample-induced aberrations and which also partially corrects aberrations of the light emitted out of the sample. US 2015/0 338 639 A1 also proposes the use of a deformable mirror, i.e. a phase modulation element operating in reflection mode. However, no particular instructions are given with regard to how to integrate such a mirror in the beam paths, or even how to preferably integrate the transmissive phase modulation element in the beam paths.

Japanese patent application publication JP 2004 341 394 A discloses a laser scanning fluorescence microscope comprising a deformable mirror for correcting aberrations which occur in imaging structures within a medium, i.e. not at the surface of the medium. The deformable mirror is arranged in a pupil plane in a beam path section which both belongs to an illumination beam path and a detection beam path. In this common beam path section of the detection beam path and the illumination or excitation beam path, a scanner is arranged in a further pupil plane. The two pupil planes mentioned are imaged onto each other by means of a relay optics at a same size, i.e. at a scale of 1:1. The disclosure of JP 2004 341 394 A starts from a prior art system applying an aberration correction by means of a deformable mirror, only. The applicant of JP 2004 341 394 A states that this prior art system does not allow for a sufficient correction, particularly for off-axis focus positions, and that this problem is solved by combining a deformable mirror with an objective of a special design.

A laser scanning fluorescence microscope known from European patent application publication EP 1 372 011 A2 and United States patent U.S. Pat. No. 7,633,053 B2, which belong to the same patent family, comprises a laser providing illumination light, a beam splitting mirror reflecting the illumination light and being transparent for detection light, and a polarization beam splitter. Depending on the polarization of the illumination light, the polarization beam splitter directs the illumination light into a first or a second branch of an illumination beam path. In each of the two branches, the respective illumination light is directed through a quarter wave plate and a zoom optics onto an active wave front modulator which is made as an adaptive reflective element, like, for example, as a mirror with a segmented adjustable mirror surface or as a membrane mirror. The zoom optics serves for adapting the aperture of the respective adaptive element to the aperture of a microscope objective. The respective illumination light reflected by the adaptive reflective element is redirected to the polarization beam splitter. By passing two times through the respective branch comprising the respective zoom optics and the respective associated quarter wave plate, the polarization of the respective illumination light is rotated by 90°. Thus, the partial light beam deflected when incident on the beam splitter passes through the beam splitter when incident in the opposite direction without deflection, and the partial light beam not deflected when incident on the beam splitter is deflected by the beam splitter when incident in the opposite direction. In this way, both partial light beams are coaxially coupled into a further common part of the illumination beam path. A lens arranged in this further common part images the planes of the wave front modulators in a plane conjugated to the back aperture of the objective. A scanning device is arranged in this conjugated plane. The illumination beam path is focused in or on a sample via a scan optics, a tube lens and an objective. Light emitted out of the sample, for example fluorescence light, is collected by the microscope objective and, depending on its polarization, takes a path opposite to the illumination light so that detection light of both polarizations coaxially emerges out of the polarization beam splitter in opposite direction to the incident illumination light. The detection light then passes through the beam splitting mirror and is directed to a confocal detection device. In contrast to coupling light into an adaptive optical system via a beam splitter as previously known, the arrangement of EP 1 372 011 A2 allows for a loss-free coupling-in. An alternative device comprises one active wave front modulator in the illumination beam path, only, and a further alternative device comprises two active wave front modulators, one of which being arranged in the illumination beam path, only, and the other of which being arranged in the detection beam path, only.

International patent application publication WO 2018/042 056 A1 and United States patent application publication US 2019/0 195 800 A1, which belong to the same patent family, relate to a method of adjusting different elements of a usual STED microscope. These documents inter alia describe the general design of such a STED microscope. It is pointed out here that an active or adaptive optics, like for example a liquid crystal technology based wave front modulator, usually designated as a SLM, a deformable mirror or a MEMS element may be arranged in the beam path of excitation light and/or of fluorescence inhibition light and/or of fluorescence light, and be operated by an adjustment device for adjusting the laser scanning microscope. Provisions for stabilizing the adjustment of the beam paths, like, for example, provisions for avoiding the influences of angle errors of the beam path with regard to each other, are not proposed. As an STED microscope which essentially corresponds to that one depicted in WO 2018/042 056 A1 is shown in accompanying FIG. 1 and described in a corresponding text part of this description, no further remarks are made at this point.

Lenz, Martin O. et al. "3-D stimulated emission depletion microscopy with programmable aberration correction", J. Biophotonics 7, No. 1-2, 29-36 (2014), disclose a special STED microscope comprising a reflective active wave front modulator arranged in a depletion beam path and based on liquid crystal technology. An active partial surface of the wave front modulator is arranged in a pupil or intersects a pupil at an angle. By means of a relay optics including a mirror and a quarter wave plate, this pupil is imaged onto a second active partial surface of the wave front modulator such that this second active partial surface is also arranged in a pupil or intersects a pupil at an angle. Each of the two partial surfaces serves for modulating one of two orthogonal polarization directions of depletion light. Both pupils are generated by imaging a back aperture of an objective by means of lenses which are exclusively arranged in the depletion beam path.

The dissertation "Intelligent-Illumination STED" by Jorn Heine, Gottingen 2017 (downloadable at http://hdl.handle-.net/11858/00-1735-0000-002E-E3B0-E) discloses a further STED microscope which comprises two excitation lasers. Means for forming a depletion beam include a wave front modulator based on liquid crystal technology designated as a SLM. One half of the SLM is used for forming a first component of the depletion beam having a first polarization, and the other half of the SLM is used for forming a second component of the depletion beam having a second polarization orthogonal to the first polarization. This function is achieved by a compact optical installation in which the incident depletion beam impinges on the first half of the SLM which modulates and reflects a first component and which does not modulate but also reflects the second component of the depletion beam. Next, the polarizations of both components are rotated by 90°. Afterwards, both components impinge on the second half of the SLM which now modulates and reflects the previously not modulated component whereas it does not modulate but reflects the component modulated at first. This installation comprising the SLM has the same function as the device described above and known from Lenz, Martin O. et al. "3-D stimulated emission depletion microscopy with programmable aberration correction", J. Biophotonics 7, No. 1-2, 29-36 (2014) but is more compact. However, it has the disadvantage, that in no case both halves of the SLM may exactly be arranged in a pupil plane. In the STED microscope, both halves of the SLM are close to a pupil plane at same distances to that pupil plane. Further, the dissertation discloses a microscope comprising a relay optics between a scan lens of a quad-scanner which is a scanner of a special design particularly suited for STED and MINFLUX microscopy, on the one hand, and a dichroic mirror serving for coupling-in the depletion light in a common beam path for excitation, depletion and fluorescence light, on the other hand.

German Patent DE 100 63 276 C2 and United States patents U.S. Pat. No. 6,914,236 B2 and U.S. Pat. No. 7,009,161 B2, which all three belong to the same patent family, disclose a STED microscope and relate to a laser scanning STED microscope which focuses a depletion beam onto a first focal area such that the first focal area overlaps with a different second focal area of an excitation beam. The STED microscope comprises elements for correcting longitudinal and transversal color aberrations between the excitation wave length and the depletion wave length particularly occurring in a scanning optics and an objective. These elements shall ensure that the overlap between the two beams remains constant during scanning. For this purpose, at least one adaptive optical element, like, for example, a deformable mirror is used. In these patents, different basic arrangements of adaptive optical elements are listed. For example, it is proposed to use an LCD element as the adaptive optical element, i.e. an SLM like in the dissertation of Jorn Heine, and to arrange this LCD element in the depletion beam path in a Fourier plane to the focal plane, i.e. in an image plane with regard to the back aperture of the objective. This element shall be readjusted during scanning to compensate for position dependent aberrations caused by the optics. German patent application publication DE 10 2011 055 367 A1 and United States patent U.S. Pat. No. 9,291,562 B2, which belong to the same patent family, describe a method and an apparatus for tracking particles in a sample. The apparatus particularly comprises an excitation laser, beam forming means, beam shifting means for laterally shifting an excitation focus in a sample plane, a sample shifting device for axially shifting a sample, an objective and a detection device for detecting fluorescence light. The beam forming means have the effect that the excitation beam forms an intensity distribution with a central zero point in the focus. The intensity distribution may, for example, correspond to a STED donut. This setup essentially corresponds to a setup which is also used for MINFLUX microscopy.

The MINFLUX method is described by Francisco Balzarotti et al. "Nanometer resolution imaging and tracking of fluorescent molecules with minimal photon fluxes", arXiv:1611.03401 [physics.optics] (2016), inclusive of the supplemental material, and in a paper by the same authors and with the name title published in Science, Vol. 355, Issue 6325, 606-612 (2017). MINFLUX microscopy is a method of determining the positions of individual fluorophores in a sample. For applying this method, it is essential that the position of one fluorophore in the sample which is to be determined at a high precision is upfront determined by means of another method than MINFLUX at a precision of the diffraction limit or better, like, for example, by means of a known method of localization microscopy. In MINFLUX, this previously determined position of the fluorophore is used. An intensity distribution having a central zero point, like, for example, a donut-shaped distribution or a one-dimensional distribution, is used for scanning a region around the predetermined position at several sampling points. At all sampling points, the fluorophore is comparatively close to the intensity minimum. From the measured intensity values of the fluorescence light emitted by the fluorophore, the position of the fluorophore can be determined at a higher precision than in the upfront determination. Starting from this determination of the position of the fluorophore at the higher precision, the step of scanning can be repeated at a smaller distance of the sampling points and with a more precise centering with regard to the actual position of the fluorophore. The MINFLUX principle is based on scanning a fluorophore with an intensity minimum. The MINFLUX principle can be realized with donut-shaped intensity profiles and with intensity profiles resulting from standing waves and also with one-dimensional intensity profiles. MINFLUX can also be applied for tracking fluorescent particles, wherein the period of time available for scanning the region around the respective temporary position of the fluorescent particles depends on the velocity of the fluorescent particles.

The setup depicted in the publication by Balzarotti et al. comprises the elements mentioned above when referring to DE 10 2011 055 367 A1 and U.S. Pat. No. 9,291,562 B2. In the above-mentioned supplementary materials for the first publication, electro-optical deflectors and piezo-electrically tiltable mirrors are mentioned as beam shifting devices for laterally shifting an excitation focus. The microscope disclosed comprises a plurality of different beam paths. There is one beam path section in which both the illumination light and the detection light are guided. A telescope which is not described further is arranged in this beam path section. Further, this beam path section includes the above-mentioned piezo-electrically tiltable mirror in a pupil plane. The available scanning range (about 20×20 pmt) is indicated, the scanner type is named (PSH-10/2, i.e. a device by piezo-system jena GmbH) and the objective used (HCX PL APO 100×/1.40–0.70 Oil CS, Leica Microsystems GmbH) is also named. From this information, in combination with data sheet figures for the scanning angle of the tiltable mirror (+/−4mrad), it can be deduced that the telescope images a pupil located between the objective and the telescope into a pupil plane of the tiltable mirror in a magnifying way and transfers a collimated beam incoming in the telescope via the tiltable mirror into a beam of a reduced cross section running towards the objective behind the telescope. A vortex wave plate is mentioned as the beam forming means which causes that the excitation beam forms an intensity distribution having a central minimum in the focus. The possibility of determining the position of the fluorophore in three dimensions by means of the MINFLUX method is mentioned by Balzarotti et al. as a straight forward add-on which could, for example, be realized by means of a z-donut. However, no particular instructions for realizing this add-on are given.

In a paper "MINFLUX nanoscopy delivers multicolor nanometer 3D-resolution in (living) cells" by Klaus C. Gwosch et al. published on the Preprint Server bioRxiv in August 2019 (doi: http://dx.doi.org/10.1101/734251), an actual realization of three-dimensional imaging by means of MINFLUX is described both with regard to the method and with regard to the apparatus used. The setup of the apparatus essentially corresponds to that one described by Balzarotti et al. A white light laser is added, and, instead of the vortex wave plate, an active element which will be further described below is used as the beam forming means. Further, it is shown how, by means of MINFLUX, three-dimensional imaging may simultaneously be executed with fluorophores of two different emission wave lengths, i.e. with fluorophores which can be spectrally separated in detection. The apparatus comprises an excitation laser, an amplitude modulator, an active wave front modulator, and an electro-optical x-y-z-shifting device consisting of electro-optical shifting devices for shifting in x- and y-direction and an electrically controllable lens of variable focal length in the illumination beam path. The type of the wave front modulator is indicated such that it can be identified as a reflective liquid crystal based modulator. This wave front modulator is used to selectively adjust the wave front of the excitation light such that the sample, through an objective, is either subjected to an intensity distribution without central zero point, to a donut or to an intensity distribution having a central, axially delimited zero point, i.e. a so called 3D donut. At a dichroic mirror, an activation beam path is coupled into a common activation and illumination beam path. Both the activation and the illumination beam path are coupled into the sample via a tiltable mirror for scanning the sample and an objective. In opposite direction to the illumination beam path, fluorescence light emitted out of the sample is directed through the objective and via the tiltable mirror, and it is coupled out of the illumination beam path and directed towards a detection device via a further dichroic mirror.

From Japanese laid open publication JP H11-326 860, both laser fluorescence microscopes scanning by means of a movable sample stage and laser scanning microscopes which have active wave front modulators for correcting aberrations which are, for example, induced by a sample and depend on an axial scanning position and/or for adjusting an axial focus position in the sample are known. In an arrangement depicted for illustrating the basic principle, a detection beam path and an excitation beam path, when viewed along the excitation beam path, are merged at a dichroic mirror into a common infinity beam path. The common beam path is guided through a telescope expanding the beam diameter to a desired size, a transmissive active wave front modulator being located in the expanded beam path. In the further course of the common beam path, an objective is arranged for focusing illumination light onto or into a sample, wherein no further optical element is located between the wave front modulator and the objective. A confocal laser microscope having a scanning stage, which differs from the above-described setup only due to the scanning stage being mentioned and due to the depiction of the detection device as a confocal detection device is depicted as one embodiment of this invention. As a further embodiment, a confocal laser scanning fluorescence microscope is depicted which comprises one wave front modulator in each of the excitation beam path and the detection beam path. Further, a multi photon laser scanning fluorescence microscope is depicted. None of the embodiments, when viewed in detection direction, comprises a common detection and excitation beam path section extending behind the scanner and comprising a telescope scaling down when viewed in detection direction.

Rueckel, M. et al. "Adaptive wavefront correction in two-photon microscopy using coherence-gated wavefront sensing", PNAS, Vol. 103, No. 46, 17137-17142 (2006) disclose a two photon microscope comprising a device for correcting sample-induced aberrations. The device comprises a deformable mirror in an illumination beam path. A section of the illumination beam path which inter alia includes the microscope objective is additionally used to direct light reflected at a calibration object onto a CCD detector. In the direction towards the CCD detector, a telescope is arranged behind the deformable mirror, the telescope reducing the beam diameter such that the beam diameter is larger on the mirror side of the telescope than on that side of the telescope facing away from the mirror. The CCD detector is arranged in a plane conjugated to a back aperture of the objective. On the CCD detector, the reflected light which is no fluorescence light is superimposed for interference with light guided through an interferometer setup. From the interference pattern, conclusions are drawn with regard to the sample-induced aberrations which are corrected for by means of the deformable mirror.

International patent application publication WO 2014/029978 A1 and United States patent U.S. Pat. No. 9,575,302 B2, which belong to the same patent family, disclose a scanning laser fluorescence microscope designed as a STED microscope and comprising: elements forming an excitation beam path which focuses excitation light for exciting fluorescence within a sample into the sample; elements forming a depletion beam path which focuses depletion light for causing stimulated emission of excited fluorophores and thus for inhibiting fluorescence into the sample coaxially with regard to the excitation light in such a way that the intensity of the depletion light has a local intensity minimum on the optical axis and which particularly focuses the depletion light in such a way that a so called STED donut evolves in the focal plane; elements forming a detection beam path which includes a confocal detection device for confocal detection of fluorescence of the sample; an objective which is a part of all three previously mentioned beam paths and configured for both focusing the beam bundles directed onto the sample into the sample and collecting and guiding fluorescence light into the detection beam path; a dichroic mirror which merges the excitation beam path and the depletion beam path in their course towards the sample and which couples the fluorescence light running along the detection beam path out of the depletion beam path, the dichroic mirror beam arranged in a beam path section in which all three beam bundles are collimated; and a piezo stage translatable in all three spatial dimensions on which samples to be imaged can be located and which is configured for shifting the samples to be images relative to a focal area of the objective and for, thus, allowing for scanning the sample in all three spatial dimensions. This setup is also described by Travis J. Gould et al. "Adaptive optics enables 3D STED microscopy in aberrating specimens"; OPTICS EXPRESS, Vol. 20, No. 19, 20999-21009 (2012).

Further, the microscope according to WO 2014/029 978 A1 and U.S. Pat. No. 9,575,302 B2 comprises a wave front modulator, particularly a liquid crystal technology based reflective wave front modulator, in the following called SLM (being an abbreviation of the standard term "spatial light modulator"), in its depletion beam path, the wave front modulator being located and configured such that it can modulate depletion light impinging thereon with regard to its phase in such a way that, after passing through further elements of the depletion beam path and focusing by the objective, forms an STED donut in the focus, on the one hand, and provides the depletion light with further modulations to achieve that aberrations caused by the sample, like, for example, by a mismatch of a refraction index of the sample and a refraction index of the immersion medium, can be compensated for in focusing into the sample so that, even in deeper areas of the sample, a high focus quality is achieved, on the other hand. According to the description of WO 2014 029978 A1 and U.S. Pat. No. 9,575,302 B2 the SLM is arranged in a pupil, i.e. in a plane conjugated to the back aperture of the objective, wherein the reflective surface of the SLM is inclined with regard to the plane of this pupil.

Further, the microscope according to WO 2014/029 978 A1 and U.S. Pat. No. 9,575,302 B2 comprises a reflective wave front modulator in its excitation beam path, which, like the previously mentioned SLM, is arranged in a pupil. In one embodiment, the wave front modulator is only arranged in the excitation beam path and made as an SLM; in another embodiment, the wave front modulator is arranged between the above-mentioned dichroic mirror and the objective, and it is thus not only in the excitation beam path but also in the depletion and in the detection beam path. In this case, the wave front modulator is made as a deformable mirror. In both cases, the wave front modulator is configured to compensate for aberrations as explained above with reference to the depletion beam path. In the latter case with deformable mirror in all beam paths, the wave front modulator compensates for aberrations in all beam paths, and the SLM only located in the depletion beam path is used for beam forming, i.e. for forming the STED donut and for compensating for aberrations of the depletion beam path. Even if this is not explicitly described, it is clear to one skilled in the art, that this relates to the compensation of remaining aberrations which are not yet compensated for by the deformable mirror. Whereas the embodiments which are mentioned here at first are described in WO 2014 029978 A1 and U.S. Pat. No. 9,575,302 B2 in detail, the embodiment mentioned here at last is only generally outlined with reference to general skill in the art.

It is a common feature of the above-described prior art scanning laser fluorescence microscopes, which are realized as simple confocal microscopes, STED microscopes or MINFLUX microscopes, that they have a beam path section in which the detection beam path and the illumination beam path coincide but are oriented in opposite directions. In STED microscopes, there also is a beam path section in which at least two illumination beam paths overlap, one of which being configured for illuminating the sample with a focus having a central intensity minimum. In MINFLUX microscopes, an illumination beam path which is configured for illuminating the sample with a focus having a central intensity minimum coincides with a detection beam path in a common beam path section. With reference to STED microscopes, the above-mentioned patent application publications WO 2018/042 056 A1 and US 2019/0 195 800 A1 address an essential problem, namely the problem of adjusting the individual beam paths with regard to each other in such a way that they coincide as exactly as possible in the common beam path section or in such a way that the projections of excitation focus and STED focus into the confocal detection plane coincide as exactly as possible and are centered there within the confocal pinhole. The patent application publications disclose options how such an adjustment may automatically be executed. In practice, such an automatic adjustment is of relevance also for the reason that a misalignment of the individual beam paths may also occur during the operation of a microscope, for example due to thermal influences. Tiltings of the dichroic mirrors used as beam couplers or splitters which occur with time here result in that the individual beam paths, after their merger, do not exactly run on one axis in a same direction but have an angle offset with regard to each other.

There still is a need of a scanning laser fluorescence microscopes configured to illuminate a sample with illumination light having a focus with a central intensity minimum in which influences of an angle offset between at least one illumination beam path for illumination light and an detection beam path on the quality of the imaging are minimized and in which the quality of adjustment of the beam paths with regard to each other is enhanced.

SUMMARY OF THE INVENTION

The present invention relates to a fluorescence microscope. The fluorescence microscope comprises an illumination beam path for illuminating a sample with illumination light, the illumination beam path including an illumination light source supplying the illumination light, a first wave front modulator for spatially modulating the illumination light, a beam splitter, a second wave front modulator for further spatially modulating the illumination light, and an objective, wherein the first wave front modulator is configured for modulating the illumination light in such a way that the modulated illumination light focused by means of the objective subjects the sample to an intensity distribution of the illumination light comprising a central intensity minimum, and wherein the second wave front modulator is adjustable, wherein an active area of the second wave front modulator is arranged in a pupil plane of the objective or intersects a pupil plane of the objective at an angle, wherein a first pupil appears at a location of the active area of the second wave front modulator. The fluorescence microscope further comprises a detection beam path for confocally detecting luminescence light emitted out of the sample, the detection beam path comprising a first section and a second section, wherein the first section of the detection beam path including the second wave front modulator and ending at the beam splitter coincides with the illumination beam path, wherein a direction of the detection beam path is opposite to a direction of the illumination beam path in the first section of the detection beam path, and wherein the second section of the detection beam path beginning at the beam splitter and including a detection unit for confocal detection of the luminescence light does not coincide with the illumination beam path. In the fluorescence microscope, a first telescope is arranged in the first section between the second wave front modulator and the beam splitter such that the first telescope images the first pupil in the direction of the detection beam path in a second pupil, the second pupil being smaller than the first pupil, and transfers a beam of the illumination light collimated in the second pupil into an expanded beam of the illumination light collimated in the first pupil.

The present invention also relates to a group of components for a fluorescence microscope having an objective. The group of components comprises a supporting structure, a first telescope including a first lens and a second lens and delimited by the first lens and the second lens, and a deformable mirror having an active area which, in a built-in state of the group of components in the fluorescence microscope, is arranged at such a position that a first pupil of the objective evolves in a plane in which the active area is arranged or which the active area intersects at an angle, wherein the first telescope is configured for imaging the first pupil in a direction away from the objective in a second pupil of the objective which is located at a distance of a focal length of the first lens to the first lens and outside the first telescope, wherein the second pupil is smaller than the first pupil.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
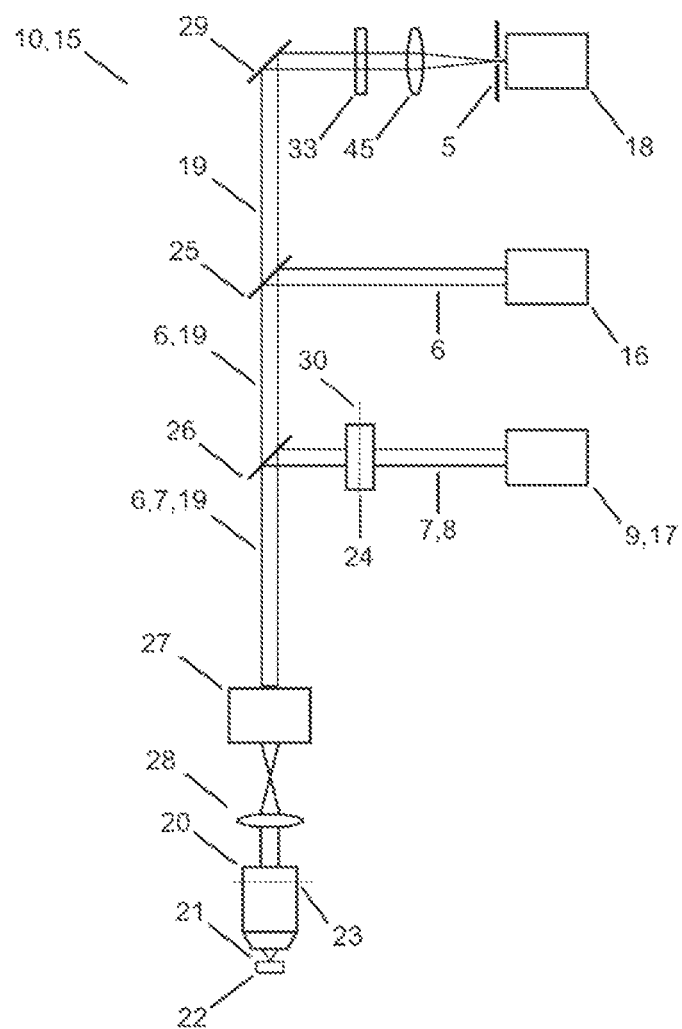
FIG. 1 is a schematic depiction of a prior art laser scanning fluorescence microscope.

In the fluorescence microscope, the first telescope has the effect that all beam bundles when viewed in the propagation direction of the fluorescence light, are narrowed or constricted together. In this way, it is achieved that angle deviations of the beam paths with regard to each other only result in smaller position deviations of their focuses in the sample with regard to each other, wherein the focus of the detection beam path in the sample is to be understood as that area of the sample which is arranged confocally with regard to the detection device. In other words, it is achieved that an illumination focus, despite angle deviations of the beam paths with regard to each other, is imaged in a confocal plane with very small position deviations only. The mode of action of the present disclosure will be further described below with reference to FIG. 4.

According to its usual definition, the term pupil is used here and in the accompanying claims for an image of an aperture or aperture stop which may be the back aperture of the objective.

A magnification factor of the first telescope determining a ratio of a first diameter of the first pupil to a second diameter of the second pupil may be at least 1.2:1, preferably at least 1.5:1 or at least 2:1. Particularly, the magnification factor or diameter ratio will be about 2:1, 2.5: or 3:1. As a rule, the magnification factor or diameter ratio will not be more than 20:1. Often it is not more than 10:1 or even not more than 5:1.

In the context of the present disclosure, the feature that the second wave front modulator is arranged such that an active area of the second wave front modulator is located in a pupil plane or that it intersects the pupil plane at an angle means that the active surface is close to the geometric location of the pupil plane. A tolerable distance of the active area to the pupil plane depends on Rayleigh lengths of the focusses in the sample and on back projections of these Rayleigh lengths out of the area of the back focal plane of the objective into the area of the pupil plane in which the second wave front modulator is arranged, respectively. These figures in turn depend on the wave lengths of the illumination light and the detection light and on the usable numeric aperture of the objective. In a typical STED microscope, distances in the area of millimeters to a few centimeters may be tolerable. Preferably, however, the distance should be kept as small as possible.

In the present description and the accompanying claims, the term "beam splitter" refers to an optical element which is suitable both for separating and combining or coupling different beam paths. Thus, each optical element designated as a beam splitter here could also be designated as a beam coupler. Typical embodiments of beam splitters or couplers for use according to the present disclosure inter alia include beam splitter cubes, semitransparent mirrors, dichroic mirrors, dichroic mirrored prisms, polarization beam splitters. Usually, any beam splitter used according to the present disclosure will be of a typical design as commonly used in fluorescence microscopes for combining or separating beam paths.

Different active systems may be used as the second wave front modulator. Both transmissive and reflective, liquid crystal technology based wave front modulator, which are often designated as SLM, are to be considered. However, the second wave front modulator is preferably made as a deformable mirror. Then, the active area can be the surface of a deformable membrane. The active area may also be made of reflecting surfaces of individual actuators. Membrane mirrors are well known in the art and they are well commercially available. Deformable mirrors whose surface is made of reflective surfaces of individual actuators comprise the advantage over membrane mirrors that their shape can be adjusted at a higher speed. Deformable mirrors have the advantage over SLMs that their action or function is not dependent on the polarization of the light to be modulated. Generally, the second wave front modulator serves for correcting for aberrations, particularly sample-induced aberrations. Due to its position, the second wave front modulator has the same effect on all beam paths and it is thus particularly also suited for correcting for aberrations of that illumination light which forms the focus with the central intensity minimum in the sample.

The first wave front modulator may be a passive or non-adjustable element, for example a wave plate. Particularly, all passive wave front modulators which are used in STED microscopy may also be used according to the present disclosure. For this reason, simple STED microscopes can be upgraded by means of groups of components according to the present disclosure or a module according to the present disclosure.

Preferably, the first wave front modulator also is an active, i. e. an adjustable, wave front modulator. This active wave front modulator may be a wave front modulator based on liquid crystal technology which is often designated as a SLM. The first wave front modulator may either be a transmissive SLM or a reflective SLM. A transmissive SLM may in a simple way be arranged perpendicular to the beam path. Thus, the effective active area, i.e. the area which serves as a reference area of the component in wave front forming, can be—and preferably is—completely placed in a pupil plane, i.e. not inclined with regard to the pupil plane. Reflective SLM can often be adjusted at a higher speed. The high speed adjustability is, for example, an advantage when the increase in spatial resolution in axial and/or lateral direction caused by a STED beam is to be varied during image taking. If the first wave front modulator also is an active wave front modulator, it may be used for compensating differences in the aberration correction between the illumination light which forms the focus with the central minimum, on the one hand, and the fluorescence light, or more general the luminescence light, and/or further illumination light, on the other hand. Also in this case, a high speed adjustability is an advantage as the aberrations may be dependent on the position in the sample.

From the prior art, for example from the publication by Lenz, Martin O. et al. ("3-D stimulated emission depletion microscopy with programmable aberration correction") and the dissertation "Intelligent-Illumination STED" by Jorn Heine, wave front modulators are known in which two partial surfaces of a reflective SLM, one after the other each, each have an effect on one given polarization direction of the illumination light. A preferred embodiment of the fluorescence microscope comprises such a wave front modulator as the first wave front modulator.

In an advantageous further development, the fluorescence microscope comprises a second telescope in the beam path between the second wave front modulator and the objective. This second telescope serves for adapting the beam diameters and for adapting the image of the active area of the second wave front modulator in the back focal plane of the objective to the back aperture. Further optical components may contribute to this imaging and to altering the beam path diameter, like, for example in a laser scanning fluorescence microscope, a scanning lens or more general a lens belonging to a scanner, and a tube lens. The second telescope is configured in such a way that the active area of the second wave front modulator is imaged into the back focal plane of the objective such as to fill the aperture, if possible, or slightly overfill the aperture.

Preferably, the fluorescence microscope is made as a laser scanning fluorescence microscope. Then, it has a scanner which is arranged in the beam path between the second wave front modulator and the tube lens.

In a preferred further development, the laser scanning fluorescence microscope comprises the second telescope. The second telescope for adapting the beam diameter to the back aperture is preferably arranged between the scanner and the second wave front modulator.

The fluorescence microscope preferably has a first deflection mirror and a second deflection mirror between which, along the beam path, the first telescope and the active area of the second wave front modulator are arranged. These deflection mirrors are positioned in such a way that even then, when they are removed from its beam path, the function of the fluorescence microscope is kept, inclusive of the beam formation for forming a focus of the first illumination light having a central intensity minimum. This has the advantage that, with a failure of the second wave front modulator which shall be used for correction for aberrations, at least a basic function of the microscope, i.e. of a STED microscope, can be reinstated in a simple way. Further, this construction has the advantage that the components serving for the correction of the aberrations may be combined in a module.

It is advantageous to place the second beam splitter or coupler as close as possible to a pupil plane or in a pupil plane. This has the advantage that the beam splitter, in case of, for example, thermally-induced tiltings occurring during the measurement time, only causes relative tiltings of the beams but no lateral offset. Thus, it is advantageous to place the beam splitter at a distance of not more than the focal length of the first lens of the telescope to the pupil plane neighboring this first lens, preferably at a distance of not more than half the focal length of this lens, and even more preferred at a distance of not more than 10% of the focal length of this first lens.

In the group of components according to the present disclosure, the magnification factor of the first telescope determining the ratio of the first diameter of the first pupil to the second diameter of the second pupil may again be at least 1.2:1, preferably at least 1.5:1 or at least 2:1. Particularly, the magnification factor or diameter ratio may be about 2:1, 2.5: or 3:1. As a rule, the magnification factor or diameter ratio will not be more than 20:1. Often it is not more than 10:1 or even not more than 5:1.

In an alternative group of components, another active element which, like the deformable mirror, serves as a wave front modulator replaces the deformable mirror.

In an embodiment, the group of components according to the present disclosure additionally includes a second telescope including—and delimited by—a third and a fourth lens. Preferably, the second telescope is made as a zoom optics.

In a further embodiment, the first telescope is made as a zoom optics.

Preferably, the group of components, besides the wave front modulator, comprises one or more deflection mirrors folding the beam path. Preferably, at least one of the deflection mirrors, along the optical path, is arranged within one of the telescopes. Preferably, this mirror is arranged at a minimum distance to a focal plane formed in the respective telescope in which the mirror is arranged. This is particularly relevant when using the group of components in a STED microscope, as very high intensities are present in the focus of a STED beam which may damage a mirror located in this focus. The minimum distance is preferably at least 20%, more preferably at least 30% and even more preferably at least 40% of the shorter one of the focal lengths of the lenses forming the respective telescope. If an deflection mirror is located within a zoom optics, it has also to be considered that in no operation state of the zoom optics an intermediate focus should be formed at the location of the deflection mirror.

Preferably, the group of components has a first deflection mirror which is configured and arranged for deflecting a light beam which impinges on it within the beam path of the fluorescence microscope along or in direction of a first optical axis along or into a direction of an optical axis of the first telescope. Further, the group of components preferably comprises a second deflection mirror which is configured and arranged for deflecting a light beam running along or in direction of an optical axis of the second telescope onto on an optical axis of the microscope. Both deflection mirrors may be arranged along a straight line and as 90° deflection mirrors. Alternatively, the two deflection mirrors may be arranged such that the axes outside the group of components onto which the deflection mirrors deflect the light beams are not identical but parallel. In such a setup, the group of components or module may be integrated in a fluorescence microscope to replace a periscope.

In a further preferred embodiment, the group of components is configured such that it is integratable in a beam path of a fluorescence microscope in such a way that the beam path, outside of the group of components, is not altered by the group of components if the deformable mirror is in a zero position.

In a preferred embodiment, the supporting structure of the group of components has an adjusting device, for example at least an elongated hole and an abutment element. The abutment element is preferably configured to extend in parallel to an optical axis of the microscope. The microscope then comprises a corresponding further abutment element which is configured to align the group of components to the optical axis, when the two abutment elements abut against each other. The group of components may then be aligned by means of the abutment elements and fixed in a movable way by means of, for example, a screw which extends through the at least one elongated hole and which is slightly tightened. Afterwards, the position of the entire group of components along the optical axis may be adjusted keeping this alignment, and afterwards the position of the group of components is fixed by means of the screw. A misalignment such that the group of components has an angle differing from 0 with regard to the optical axis of the microscope may be corrected if at least one of the abutment elements includes suitable elements for fine adjustment, like, for example, stop screws.

An adjustment device is particularly advantageous, if the elements of the group of components including the supporting structure are adjusted or aligned with regard to each other. In this case, the group of components is a module which, as a whole, may be integrated in the beam path of a fluorescence microscope and then only has to be oriented or aligned as a whole with regard to the beam path of the microscope.

Now referring in greater detail to the drawings, the fluorescence microscope 10 schematically depicted in FIG. 1 is a prior art laser scanning fluorescence microscope 15. The laser scanning fluorescence microscope 15 comprises an excitation light source 16 for excitation light 6. The excitation light 6 is reflected by a first beam splitter 25 towards a second beam splitter 26. Both beam splitters 25 and 26 may be made as dichroic mirrors. The second beam splitter 26 serves for superimposing the excitation light 6 with first illumination light 8 which is fluorescence inhibition light 7 coming from a fluorescence inhibition light source 17, here. Correspondingly, the fluorescence inhibition light source 17 is also designated as a first illumination light source 9, here. Both beam splitters 25, 26 further serve for separating a detection beam path for fluorescence light 19 from illumination beam paths of the excitation light 6 and the fluorescence inhibition light 7. The beam splitter 26 splits the detection beam path and the beam path of the excitation light 6 off the common beam path of the fluorescence light 19, the fluorescence inhibition light 7 and the excitation light 6. Next, the beam splitter 25 splits the detection beam path off the common beam path of the fluorescence light 19 and the excitation light 6. A first wave front modulator 24 is arranged in the beam path of the fluorescence inhibition light 7 between the fluorescence inhibition light source 17 and the beam splitter 26. By means of a scanner 27 including a lens and by means of a tube lens 28 the fluorescence inhibition light 7 and the excitation light 6 are directed through a focusing objective 20 into a sample space 21. A sample 22 is arranged in the sample space 21. The excitation light 6 and the fluorescence inhibition light 7 are focused into the sample 22. The first wave front modulator 24 modulates the fluorescence inhibition light 7 such that, when the objective 20 focuses the fluorescence inhibition light 7, a focus having a central intensity minimum is formed in the sample 22.

Fluorescence light 19 emitted out of the sample 22 gets through the objective 20, the tube lens 28, the scanner 27 and the beam splitters 26 and 25 via a mirror 29 and through a filter 33, a lens 45 and a pinhole 5 onto a detector 18. The lens 45 focuses the fluorescence light 19 onto an aperture of the pinhole 5. The first wave front modulator 24 is only depicted schematically. The first wave front modulator 24 may be a passive non-adjustable element, like, for example, a wave plate, or an active adjustable element, like, for example, an SLM 61, 61' or a group of components particularly including one or several reflective SLM 61 or including a reflective SLM 61 having two active partial surfaces. An example of such a group of components is described in the above-mentioned paper by Lenz, Martin O. et al. ("3-D stimulated emission depletion microscopy with programmable aberration correction") and the above-mentioned dissertation "Intelligent-Illumination STED" by Jorn Heine. If the first wave front modulator 24 is a passive element, it is preferably arranged in a collimated beam of the fluorescence inhibition light in a pupil, i.e. in a pupil plane 30, in such a way that the first wave front modulator 24 is imaged on the back aperture 23 of the objective 20 such that it fills the back aperture 23. If the first wave front modulator 24 is a simple reflective active element, this active element is as a rule arranged such that its active area 44 intersects a pupil plane 30 at an angle. If the first wave front modulator is a group of components, preferably either each active area or partial area is arranged in a pupil plane 30 or intersects a pupil plane 30 at an angle, or the pair of the active areas or partial areas is arranged around a pupil plane 30. Generally, it is also possible to arrange the active areas or partial areas of the first wave front modulator 24 remote from a pupil plane or even in a section of the beam path in which the fluorescence inhibition light is not collimated. Passive elements like wave plates which besides vortex wave plates also include segmented vortex wave plates, other segmented wave plates and combinations of such elements, when used as first wave front modulators 24 which only serve for statically forming a focus comprising a central intensity minimum, are actually often arranged in a collimated beam path but outside of a pupil plane. The arrangement in the collimated beam path, particularly in combination with the arrangement in the pupil plane 30, has the result that the relation between the shapes of the wave front at the location of the wave front modulator 24 and at the location of the back aperture 23 can be described easily. With an arrangement in a pupil plane, the wave front shapes are identical except for a factor corresponding to an imaging scale. This is particularly advantageous, if an active first wave front modulator 24 is used. If the first wave front modulator 24 which is only schematically depicted here is a group of components, it includes additional optical elements for beam guiding. Further optical elements which are necessary for imaging the back aperture 23 of the objective 20 into the pupil plane 30 or in pupil planes 30 are also not depicted in FIG. 1. The depicted laser scanning microscope 15 may be operated as a confocal laser scanning microscope without using the fluorescence inhibition light 7. The fluorescence inhibition light 7 may be depletion light. In this case, the laser scanning microscope 15 is operating as a STED microscope, if the fluorescence inhibition light 7 being depletion light is used.

Figure 2:
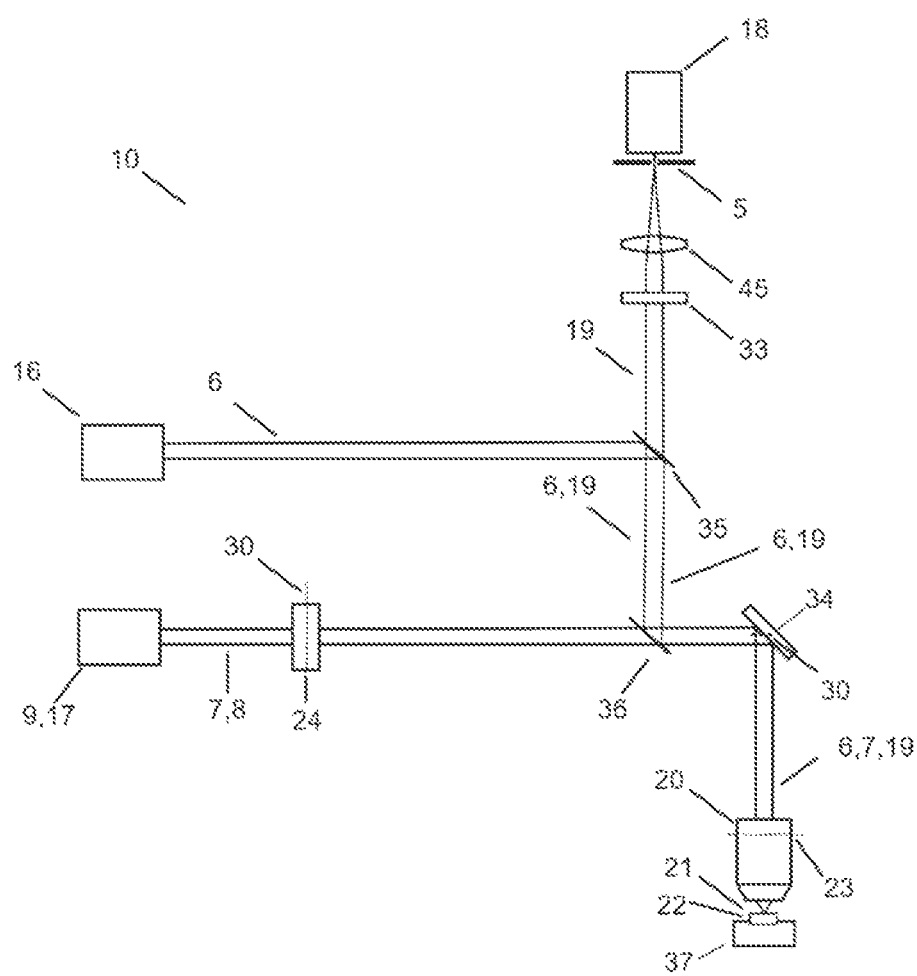
FIG. 2 is a schematic depiction of a prior art laser scanning fluorescence microscope with means for correcting sample-induced aberrations.

FIG. 2 is a schematical depiction of a laser fluorescence microscope 10 with installations for correcting sample-induced aberrations as it is essentially known from WO 2014/029 978 A1 and U.S. Pat. No. 9,575,302 B2. This laser fluorescence microscope 10 also is an STED microscope.

The laser fluorescence microscope 10 according to FIG. 2 comprises the excitation light source 16 for the excitation light 6. The excitation light 6 is reflected by a beam splitter 35 towards a further beam splitter 36. Both beam splitters 35, 36 may be dichroic mirrors. The beam splitter 36 serves for superimposing the excitation light 6 with the fluorescence inhibition light 7 coming from the fluorescence inhibition light source 17 and passing the first wave front modulator 24 on its way to the beam splitter 36. Here. the first wave front modulator 24 is an active element like an SLM 61, 61' or a group of components particularly including one or more reflective SLM 61 or an SLM 61 with two active areas. If the wave front modulator 24 is a simple reflective active element, it is, as a rule, arranged such that its active area 44 intersects the pupil plane 30 at an angle. If the first wave front modulator 24 is a group of components, either each active area or partial area is arranged in a pupil plane 30 or intersects a pupil plane 30 at an angle, or the pair of the active areas or partial areas is arranged around a pupil plane 30. The beam splitter 36 further serves for separating the detection beam path for the fluorescence light 19 together with the beam path for the excitation light 6 from the beam path for the fluorescence inhibition light 7. In the common beam path for the fluorescence inhibition light 7, the excitation light 6 and the fluorescence light 19, a second wave front modulator 24 is arranged which intersects a pupil plane 30 and is inclined with regard to the pupil plane 30 and which is made as a reflective active wave front modulator, particularly as a deformable mirror 51. This second wave front modulator 24 guides the illumination light beams of the excitation light 6 and the fluorescence inhibition light 7 into the back aperture 23 of the objective 20 which focuses the illumination light beams into the sample 22 which, in the sample space 21, is on a positioning stage 37. In the opposite direction, fluorescence light emitted by the sample 22 is guided through the objective 20 onto the second wave front modulator 34 and from the second wave front modulator 34 onto the beam splitter 36 which directs the fluorescence light 19 to the further beam splitter 35. This beam splitter 35 separates the detection beam path for the fluorescence light 19 from the beam path for the excitation light 6 and guides the fluorescence light 19 via the filter 23 and the lens 45 which focuses the fluorescence light 19 onto a pinhole 5 to the detector 18. In this arrangement, the first wave front modulator 24 at first serves for modulating the beam of the fluorescence inhibition light 7 in such a way that the fluorescence inhibition light 7 is focused by the objective 20 into the sample 22 in such a way that the focus has a central intensity minimum. Once again the fluorescence inhibition light 7 is also designated as the first illumination light 8 and the fluorescence inhibition light source 17 is designated as the first illumination light source 9, here. The second wave front modulator 34 serves for adapting the pre-modulated wave fronts of the fluorescence inhibition light 7, depending on sample-induced aberrations which may, for example, also depend on the axial position of the focus, in such a way that the intensity distribution of the fluorescence inhibition light in the focus is as independent as possible from the aberrations and the axial position of the focus, respectively. Thus, the second wave front modulator 24 serves for compensating for aberrations of the fluorescence inhibition light 7 such that an as un-aberrated as possible focus is formed in the sample. At the same time, the second wave front modulator 34 also serves for modulating the aberrated wave fronts of the fluorescence light 19 emitted out of the sample 22 in such a way that the emission focus is imaged onto the pinhole 15 in an as un-aberrated way as possible and for also focusing the excitation light 16 into the sample 22 in an as un-aberrated way as possible. As the wave lengths of the excitation light 6, the fluorescence inhibition light 7 and the fluorescence light 19 differ, a perfect compensation of the aberrations of all light beams by means of the one second wave front modulator 34 is not possible. However, as the wave lengths of the excitation light 6 and the fluorescence light 19 only differ little, the aberrations of the two associated light beams may well be compensated simultaneously. The first wave front modulator 34 which pre-modulates the wave fronts of the fluorescence inhibition light 7 with regard to the formation of the focus with the central intensity minimum now additionally serves for compensating the aberrations of the fluorescence inhibition light 7 which remain after passing the second wave front modulator 34. Methods for detecting the aberrations and for controlling the device with the goal of an aberration-free observation of the sample are, for example, described in WO 2014/029 978 A1 and U.S. Pat. No. 9,575,302 B2.

Figure 3A:
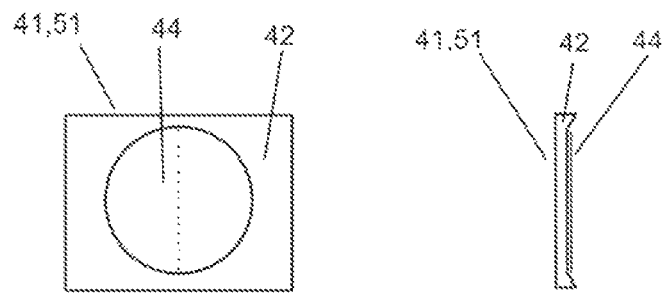
FIGS. 3A, 3B and 3C schematically shows examples of known active wave front modulators.
Figure 3B:
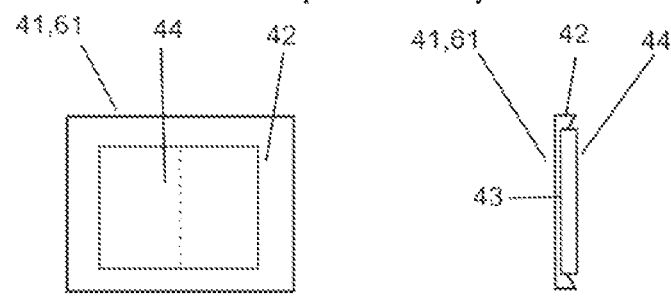
Figure 3C:
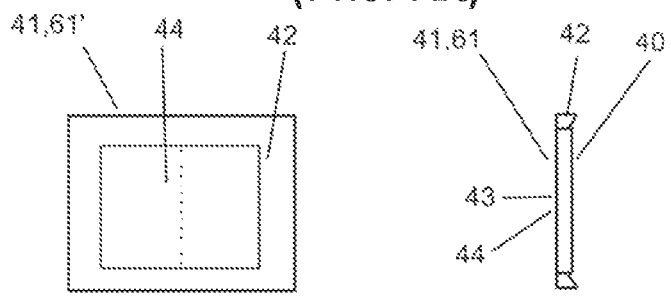

FIGS. 3A to 3C serve for illustrating the design and function of different active wave front modulators 41.

FIG. 3A schematically depicts a deformable mirror 51. This deformable mirror 51 comprises a supporting structure 42 and the active area 44. The active area 44 is mirror-reflective, and it may, for example, be the mirror-reflective surface of a deformable membrane. Alternatively, it may be made of mirror-reflective surfaces of individual actuators such that the active area 44 is a segmented area. The active area 44 is operationally connected to the supporting structure 42. Elements by which the active area 44 can be deformed are integrated in the supporting structure 42. In FIG. 3A, the active area 44 is depicted as a circular area as it is often the case with membrane mirrors. Generally, the active area 44 may also have another shape, like for example a hexagonal or rectangular shape. If a plane wave front impinges on such a mirror, this mirror causes different local phase retardations depending on its present shape or deformation.

FIG. 3B schematically depicts a wave front modulator based on liquid crystal technology which is usually designated as a SLM and which functions as a reflective element. In this wave front modulator comprising the supporting structure 42 and the active area 44, the active area 44 as such is not mirror-reflective but an incoming wave front and an outgoing modulated wave front pass there through. On the way from the active area 44 up to a backside 43 at which the wave front is reflected and back to the active area 44, the wave front of a certain polarization is subject to different local phase retardations depending on local settings of liquid crystals embedded between the active area 44 and the backside 43. Such SLMs 61 can be operated in such a way that the rule incident angle equals emergent angle is fulfilled in a zero position of the SLM 61. Often, however, such SLMs 61 are operated in a way that all the liquid crystals together act as a diffraction grating such that a vast predominating portion of the incident wave front is reflected in a first order of diffraction. Further, the SLM 61 serves for retarding the emergent wave front locally differently with regard to its phase. Most SLM are pixelated and have a rectangular active area 44 as depicted. Generally, this active area 44 may have another shape.

FIG. 3C schematically depicts a wave front modulator based on liquid crystal technology which is a transmissive element. In the following, this wave front modulator is designated as a SLM 61'. This SLM 61' has the supporting structure 42, an entrance area 40 and the backside 43 acting as the active area 44. An incident wave front enters through the entrance area 40 and emerges as a modulated wave front out of the active area 44. Most transmissive SLM 61' are also pixelated and have, as depicted, a rectangular active area 44. Generally, the active area 44 may also have another shape.

Figure 4A:
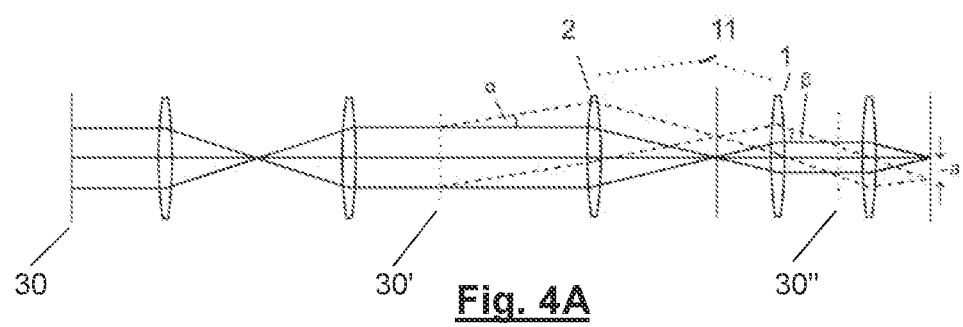
FIGS. 4A and 4B illustrate the effect of the present disclosure by means of a comparison of two beam paths.
Figure 4B:
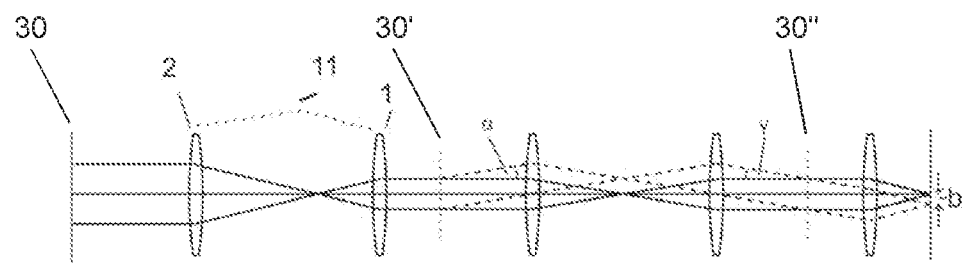

FIGS. 4A and 4B serve for explaining the basic principle of the present disclosure. In both beam paths according to FIGS. 4A and 4B, beam bundles which orthogonally pass through a pupil plane 30 in the left-hand part of FIGS. 4A and 4B, respectively, are each adapted with regard to their beam diameter by means of two telescopes, and the beam bundles are focused by means of a further lens. In a microscope, a confocal lens could be arranged in the plane of the focus. In both beam paths, the focusing further lens has the same focal length, and the beam diameter is identical in both beam paths after passage through the second telescope. In the fluorescence microscope according to the present disclosure the second wave front modulator 34 may be arranged in the pupil plane 30. In the beam path according to FIG. 4A, the beam bundle first passes through a telescope which does not alter the beam diameter. In the beam path according to FIG. 4B, the light bundle first passes through a telescope 11 made of a lens 2 and a lens 1 which reduces the beam diameter to a half. In both beam paths according to FIGS. 4A and 4B, a further pupil plane 30' is then indicated as a dotted line. In the fluorescence microscope according to the present disclosure, a beam splitter 26 is arranged in or close to this pupil plane 30', the beam splitter 36 separating the illumination beam path for the illumination light 8 which forms the focus with the central intensity minimum in the sample 22 inter alia from the detection beam path for the fluorescence light 19, if viewed in the direction from the objective 20 of the microscope. At such a beam splitter 26, an angle error between these beam paths may be introduced. According to the present disclosure, the influence of such an angle error on the imaging quality is reduced. To illustrate this effect, beam bundles which pass through the pupil plane 30' at a tilting angle α with regard to the optical axis and which have a same diameter as the untilted beam bundle in the pupil 30' are depicted in FIGS. 4A and 4B as dashed lines. In FIG. 4A, this beam bundle of an at first large beam diameter runs through the telescope 11 which reduces the beam diameter to a half. Afterwards, the beam bundle is focused, wherein the focus is formed at a lateral distance a to the focus of the untilted beam bundle. In FIG. 4B, the beam bundle already reduced in beam diameter as compared to the beam diameter in the pupil plane 30 runs through a telescope which does not further alter the beam diameter. Afterwards, the beam bundle is focused, wherein the focus is arranged at a lateral distance b to the focus of the untilted beam bundle. The distance b is by a factor smaller than the distance a, which corresponds to the factor by which the beam diameter is narrowed down by the telescope 11. Particularly, a ratio the distance a to the distance b is about 2:1, here. Thus, FIG. 4B shows the effect of the present disclosure that the result of a tilt of two partial beam paths onto their imaging into a confocal pinhole is smaller, if the beams there, where their tilt is introduced, have a smaller beam diameter due to the telescope 11.

Of course, it is possible that a tilt is introduced at another location than the pupil plane 30'. If this is the case, the respective beam bundle passes through the pupil plane 30* tilted and at an offset. However, the position of the focus is only affected by the tilt. Nevertheless, it can be advantageous to arrange the beam splitter 26 which separates the illumination light 8 in a pupil plane 30'. In both beam paths depicted in FIGS. 4A and 4B it can be seen, that the tilted beam bundle which passes through the pupil plane 30' symmetrically with regard to the optical axis also passes through a pupil plane 30'' symmetrically with regard to the optical axis. An offset in the one pupil plane 30' results in a corresponding offset in the pupil plane 30''. In a STED microscope, for example, a further wave front modulator, i.e. the first wave front modulator 24, may be arranged in this pupil plane 30''. Particularly, this first wave front modulator 24 is to be arranged symmetrically with regard to the optical axis. Thus, it is important to arrange the beam paths in such a way that an offset of the beam paths at the location of the first wave front modulator is avoided as much as possible.

Instead of a tilt, a beam splitter may introduce an offset in a pupil plane. In FIGS. 4A and 4B, the lines delimiting a beam bundle may each be regarded as thin beam bundles which are laterally offset with regard to each other. From FIG. 4A it can be seen that an offset which corresponds to the diameter of the large bundle in the pupil plane 30' is transferred into an offset which corresponds to the diameter of the bundle reduced to a half in the pupil plane 30'', whereas in the beam path according to FIG. 4B, the offset in the pupil plane 30'' is equal to the offset in the pupil plane 30'. This means that the principle of the present disclosure is not advantageous with regard to avoiding the effects of a lateral offset. However, the inventors have found that, in practical applications, predominantly angle errors occur whose effects are to be avoided. In case that the first wave front modulator 24 is not directly arranged in a pupil plane 30 for practical reasons, this is also related to the fact that, with increasing distance to the pupil plane, a larger angle error results in a larger lateral offset on the first wave front modulator 24. Avoiding the angle error by means of the present disclosure then overcompensates the magnification of the lateral offset in a pupil plane.

Figures 5A, 5B:
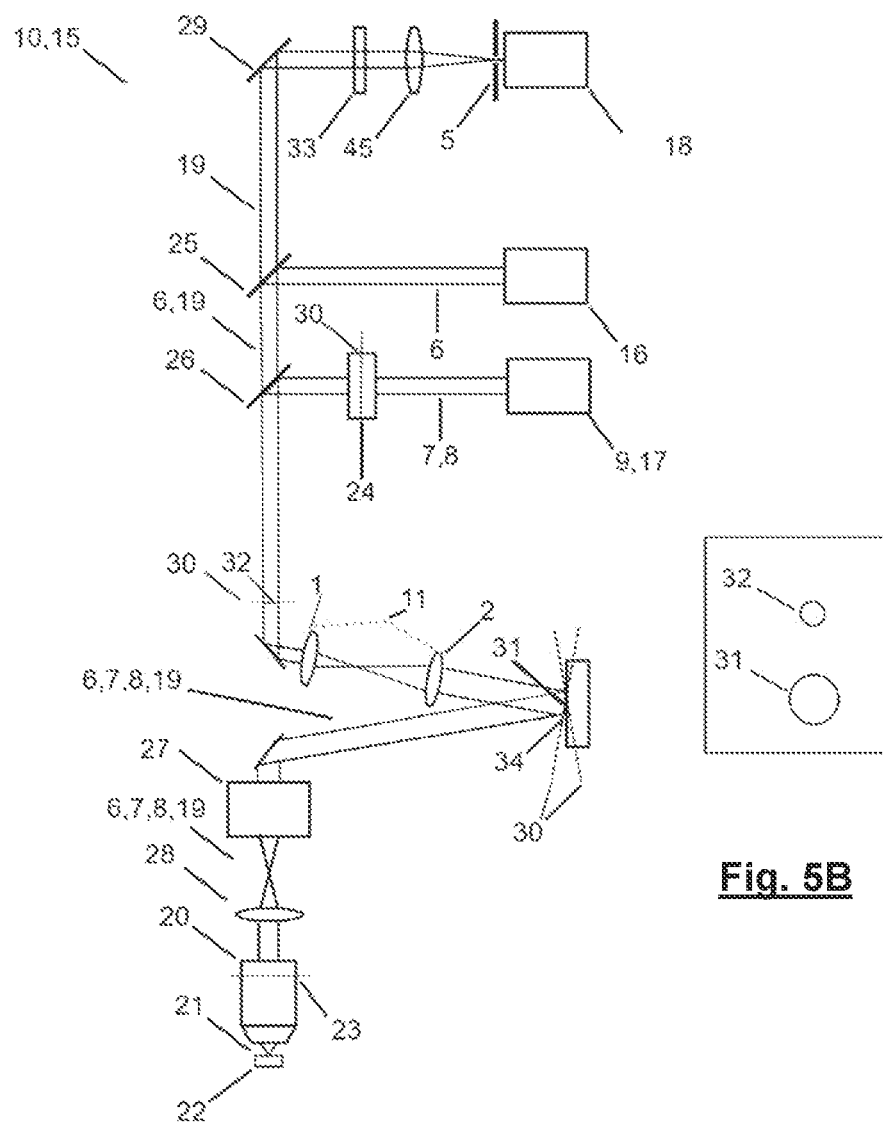
FIGS. 5A and 5B show an embodiment of a fluorescence microscope according to the present disclosure which is designed as a STED microscope, and two pupils formed in this fluorescence microscope.

The fluorescence microscope 10 schematically depicted in FIG. 5A is a laser scanning fluorescence microscope 15 according to the present disclosure. To a large extent, it corresponds to the laser scanning fluorescence microscope 15 depicted in FIG. 1. Additionally, it has a second wave front modulator 34 in a first beam path section through which all the excitation light 6, the fluorescence inhibition light 7 and the fluorescence light 19 run through. This second wave front modulator 34 is designed as an active, i. e. as an adjustable or adaptive, element. It may be a reflective SLM 61. Preferably, the second wave front modulator 34 is a deformable mirror 51. The second wave front modulator 34 has the active area 44, see FIG. 3A to 3C. This active area 44 is arranged such as to intersect a pupil plane 30 at an angle, a first pupil 31 being formed at the location of the active area 44. This means that there is an image of the aperture of the objective 20 at the location of the active area 44. As the active area 44 of the first wave front modulator 34 is inclined or tilted with regard to the optical axis, this only applies approximately. Thus, the formulation "at the location of the active area 44 of the second wave front modulator 34" is to be understood here in that the image of the aperture of the objective 20 and the active area 44 of the second wave front modulator 34 coincide at least along a line which is orthogonal to the optical axis. Preferably, this line intersects the optical axis. In FIG. 5A, the pupil planes 30 and the back aperture of the objective 20 are indicated by dashed lines. In the area of the second wave front modulator 34, two intersecting lines are drawn one of which indicating the position of the pupil plane 30 without considering the second wave front modulator 34, here made as a mirror-reflective element, and the other of which indicating the position of the pupil plane 30 after reflection at the active area 44 of the second wave front modulator 34. Along the propagation direction of the fluorescence light 19, i.e. from the second wave front modulator 34 towards the detector 18, the laser scanning fluorescence microscope 15 according to the present disclosure has the first telescope 11 which is here made of the first lens 1 and the second lens 2. According to the present disclosure, this first telescope 11 images the first pupil 31 into a second pupil 32 which is smaller than the first pupil 31. In the embodiment according to FIG. 5A, both the telescope 11 and the second pupil 32 are arranged within a beam path section which is delimited by the beam splitter 26 and includes the second wave front modulator 34 and in which the detection beam path coincides with the illumination beam paths, i.e. with the beam paths for the excitation light 6 and the fluorescence inhibition light 7, wherein the direction of the detection beam path is opposite to the direction of the illumination beam paths.

In the box according to FIG. 5B, the dimensions of the pupils 31 and 32 are depicted schematically. A ratio of a first diameter of the first pupil to a second diameter of the second pupil is about 2:1, here.

The telescope 11 has the effect that all beam bundles from the point of view of the propagation direction of the fluorescence light 19 are narrowed down together. In this way it is achieved that angle deviations of the beam paths with regard to each other do only result in small position deviations of the focuses with regard to each other in the sample 22, wherein the focus of the detection beam path in the sample is to be understood here as that area in the sample which is arranged confocally with regard to the pinhole 5. To achieve this minimally possible position deviation, all beams have to have a small effective diameter when being combined or coupled. However, this can also be achieved if only the telescope 11 is arranged within the above-mentioned first section of the detection beam path or within all beam paths and if the pupil 32 when viewed in the propagation direction of the fluorescence light 19 is only formed behind the beam splitter 26, i. e. in a second beam path section of the detection beam path not coinciding with all illumination beam paths.

Figures 6A, 6B:
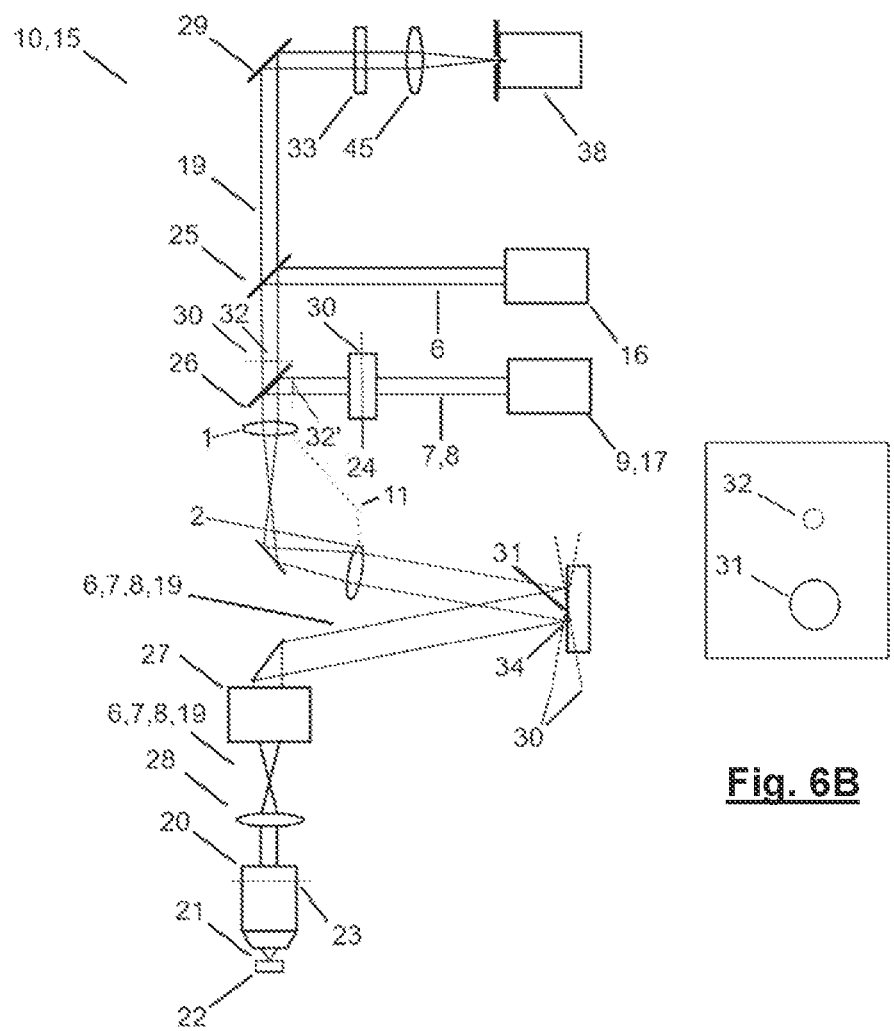
FIGS. 6A and 6B show a further embodiment of a fluorescence microscope of the present disclosure which is designed as a STED microscope, and two pupils formed in this fluorescence microscope.

In this embodiment of the present disclosure, which is depicted in FIG. 6A, a pupil 32' is formed in the beam path of the fluorescence inhibition light 7 which has the same distance to the beam splitter 26 and a same size as the pupil 32. The pupil 32' may be in the pupil plane 30 in which the first wave front modulator 24 is arranged but this is not mandatory. In FIG. 6A which like FIG. 5A is not to scale, the formation of the pupil 32' outside of the plane of the first wave front modulator 24 is depicted. For forming a pupil plane 30 or several pupil planes 30 in which the active areas or partial areas of the first wave front modulator 24 are preferably arranged, further imaging elements are required which are not depicted in FIG. 6A.

The effective cross-section of an illumination beam is to be understood as the maximum cross-section which contributes to the further course of the intensity distribution within the back aperture 23 of the objective 20. The actual beam cross-section during coupling or combining of the beam paths has no effect on the position deviations if the back aperture is overfilled, i.e. if the beam cross-sections of the illumination beam paths in the back aperture are larger than the cross-section of the back aperture. As a rule, the actual beam cross-sections, particularly that one of the fluorescence inhibition light 7 are selected such that the back aperture is just overfilled.

Further, instead of a pinhole 5 and a detector 18 a detection device 38 for confocal detection is schematically depicted in FIG. 6A. This device may be one of different kinds of detection devices. It is important that the entrance of detection device 38 for the photons to be detected is arranged confocally with regard to the fluorescent volume to be imaged. For example, it is possible to use an array detector arranged in a focal plane as the detection device 38. The area of this array detector receiving light to be detected is then preferably adjusted to the size of the diffraction limited light distributions be detected with the array detector, which, depending on the actual application, is slightly larger, for example in such a way that the light receiving surface includes up to 1.2 Airy diameters of diffraction limited light distributions to be detected, or even clearly larger so that the light receiving area includes more than 1.2 or more than 1.5 or more than 2 or up to 3 Airy diameters. Preferably, such an array detector is to be arranged so that its area center, with fully adjusted beam paths, is located on the optical axis.

In the box of FIG. 6B the dimensions of the pupils 31 and 32 in the embodiment of the fluorescence microscope according to FIG. 6A are depicted schematically. The ratio of the first diameter of the first pupil to the second diameter of the second pupil is about 2.5:1, here.

Figures 7A, 7B:
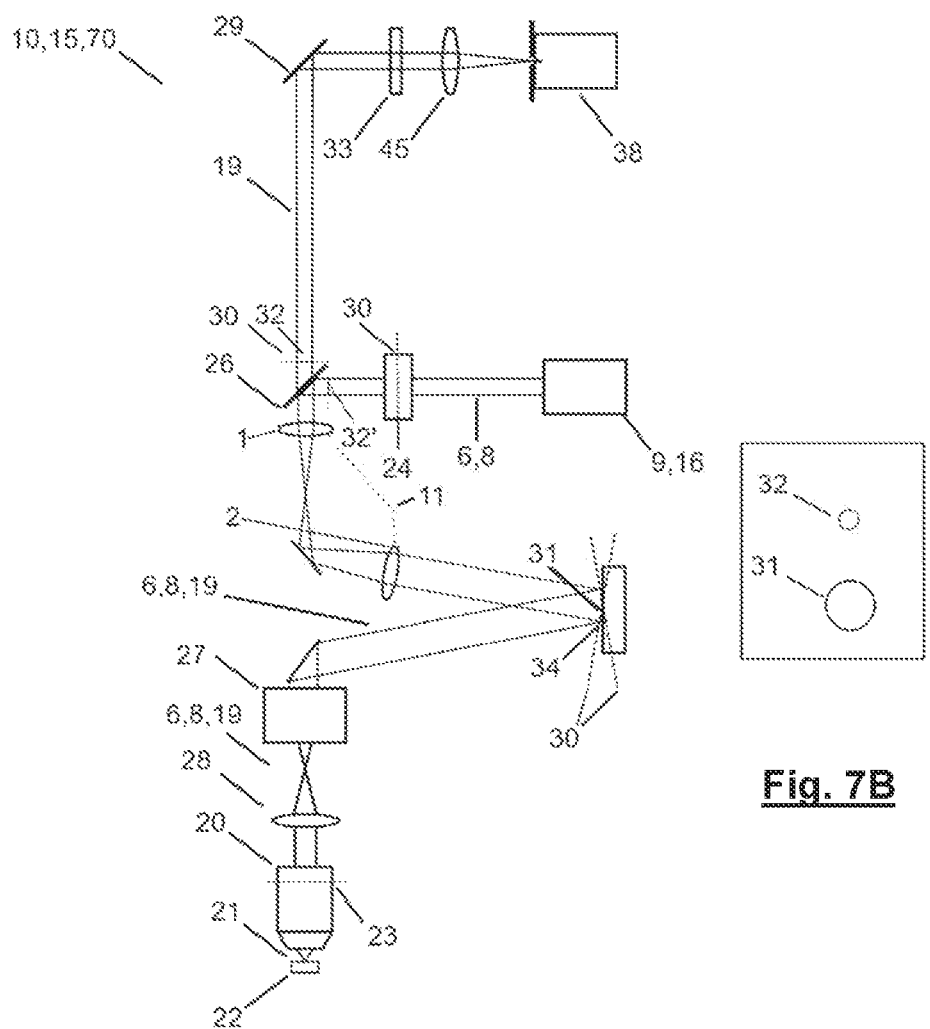
FIGS. 7A and 7B show essential elements of an embodiment of a fluorescence microscope of the present disclosure which is designed as a MINFLUX microscope, and two pupils formed in this fluorescence microscope.

FIG. 7A shows essential elements of an embodiment of a fluorescence microscope 10 according to the present disclosure which is designed as a MINFLUX microscope 70. This MINFLUX microscope 70 also is a kind of a laser scanning fluorescence microscope 15. The basic design corresponds to the STED microscope depicted in FIG. 6A. In contrast to this STED microscope, the first illumination light source 9 is configured as an excitation light source 16 in the MIN-FLUX microscope 70. Correspondingly, the first illumination light 8 is the excitation light 6. This excitation light 6 is modulated in the first wave front modulator 24 such that it, after being focused by the objective 20, forms an illumination focus having a central intensity minimum in the sample 22. Also in this fluorescence microscope 10 designed as a MINFLUX microscope 70, the beam splitter 26 serves for coupling or combining the beam paths for the fluorescence light 19 and the first illumination light 8.

Figures 8A, 8B:
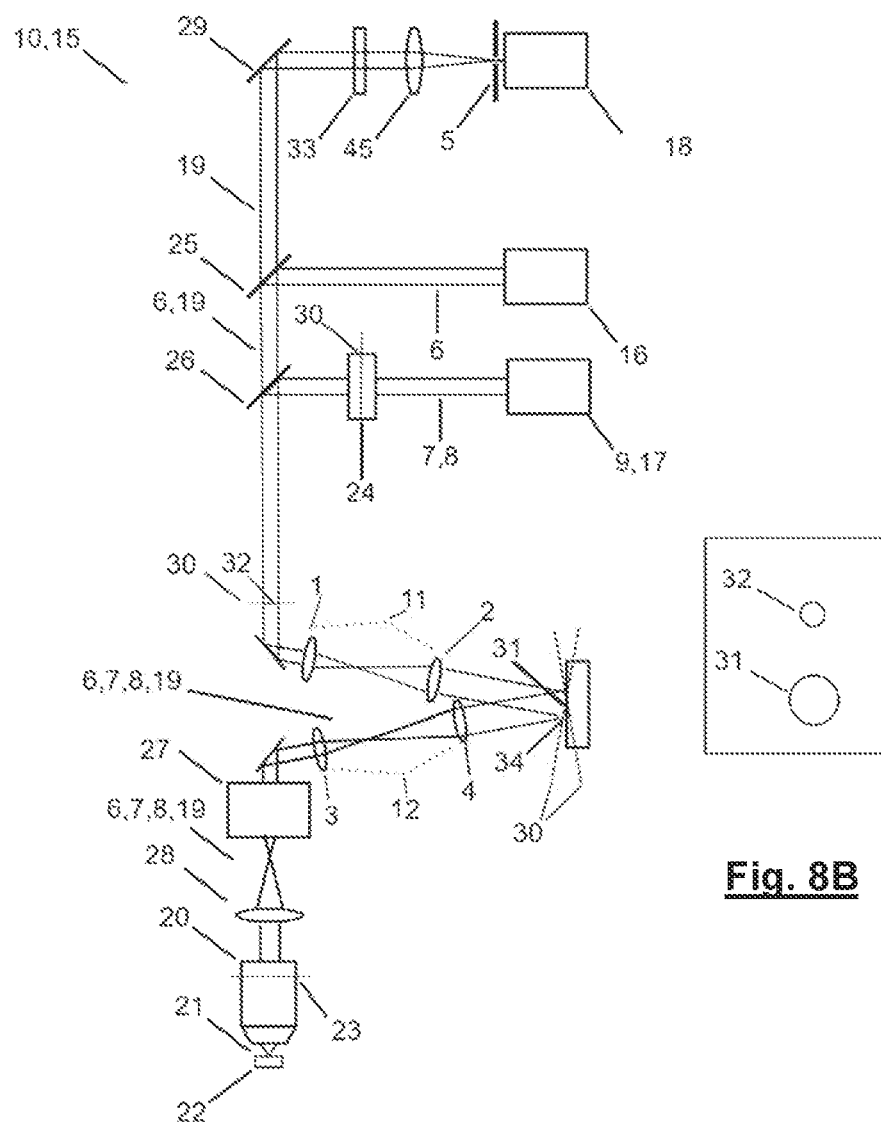
FIGS. 8A and 8B show a further embodiment of the fluorescence microscope of the present disclosure which is designed as a STED microscope, and two pupils formed in this fluorescence microscope.
Figure 10:
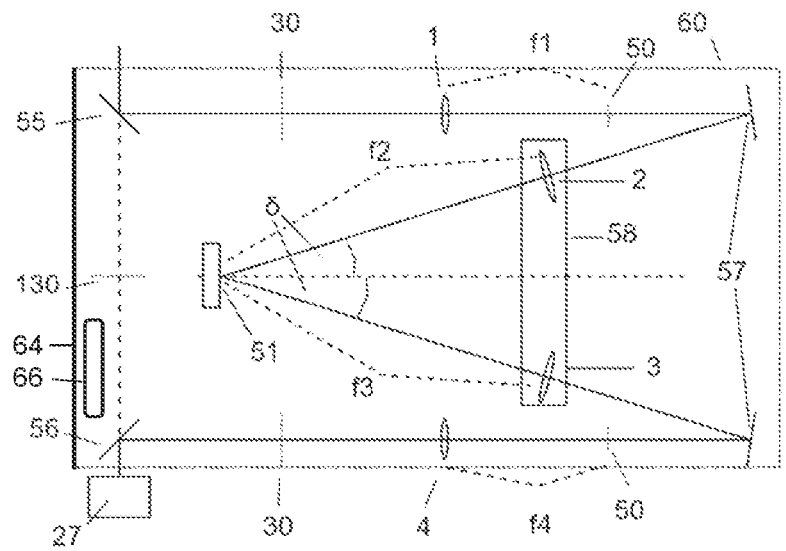
FIG. 10 shows a group of components according to the present disclosure for upgrading a fluorescence microscope, the group of components on a base plate comprising an active wave front modulator in a common beam path for fluorescence light and illumination light, together with a scanner.
Figure 11:
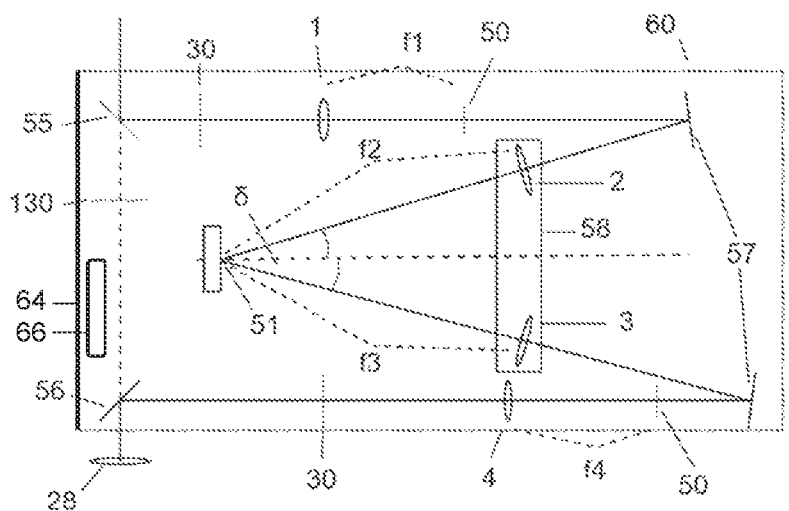
FIG. 11 shows a further group of components according to the present disclosure for upgrading a fluorescence microscope, the group of components on a base plate comprising an active wave front modulator in the common beam path for the fluorescence light and the illumination light, together with a tube lens.
Figure 12:
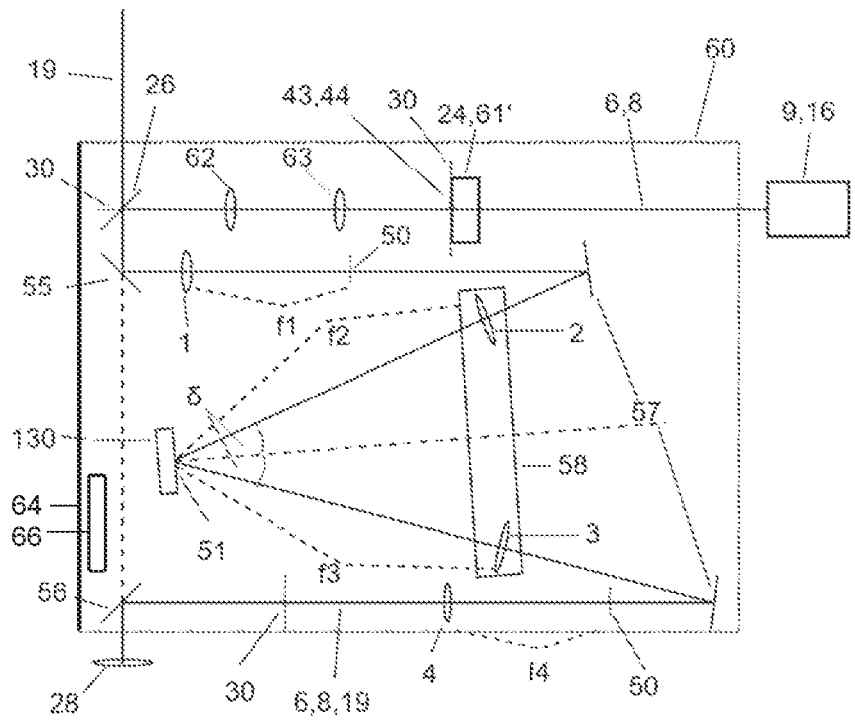
FIG. 12 shows a further group of components according to the present disclosure for upgrading a fluorescence microscope, the group of components on a base plate comprising an active wave front modulator in the common beam path for fluorescence light and illumination light and a further wave front modulator for forming the illumination focus, together with a tube lens.

In the box of FIG. 7B the dimensions of the pupils 31 and 32 in the embodiment of the fluorescence microscope according to FIG. 7A are depicted schematically. The ratio of the first diameter of the first pupil to the second diameter of the second pupil is about 2.5:1, here. The fluorescence microscope 10 schematically depicted in FIG. 8A corresponds to a large extent to that one depicted in FIG. 5A. In contrast to the fluorescence microscope 10 depicted in FIG. 5A, the fluorescence microscope 10 depicted in FIG. 8A comprises a second telescope 12 which is made of two lenses 3 and 4. Generally, the telescope 12 may comprise further lenses. Then, the lenses 3 and 4 delimit this telescope 12. The same applies to the first telescope 11. In this and all other embodiments of the fluorescence microscope 10 according to the present disclosure, this first telescope 11 may also comprise more lenses than the depicted lenses 1 and 2. In such a case, the depicted lenses 1 and 2 are the lenses delimiting the telescope 11. According to the present disclosure, in all embodiments of the fluorescence microscope 10, it shall be achieved by means of the first telescope 11 that the beams of the first illumination light 8 and the fluorescence light 19 and, if present, of further illumination light, which may then be for example excitation light 6, have an as small as possible cross-section or diameter at the location of the separation of the fluorescence light 19 when viewed in the detection direction. However, it is advantageous at the same time to make as full use as possible of the active area 44 of the second wave front modulator 34. This active area 44 may be as large as, larger than or smaller than the pupil at the location of the active area 44 of the second wave front modulator 34. To effectively make use of the active area 44 of the wave front modulator 34, an adaption of the beam diameter has to take place along the optical paths from the back aperture 23 to the second wave front modulator 34. This adaption is preferably realized in that a beam filling the back aperture 23 of the objective is adapted such that its diameter at the location of the active area 44 of the second wave front modulator 34 is not larger than its active area 44. Otherwise a light beam guided via the active area 44 could not fill the back aperture 23 of the objective 20. At the same time, the optical elements are to be designed such that the back aperture 23 is precisely imaged onto the active area 44 of the second wave front modulator 34 such that a pupil is formed at the location of the active area 44 of the second wave front modulator 34. The diameter of the pupil corresponds to the beam diameter in the corresponding plane. In this context it is to be pointed out that all figures including FIG. 8A are not drawn to scale. However, FIGS. 10 to 12 are geometrically constructed to some extent. The fluorescence microscope depicted in FIG. 8A is a laser scanning fluorescence microscope 15. Besides the objective 20, this laser scanning microscope 15 has a tube lens 28 and a scanner 27 as usual. The term scanner is to be understood as referring to a device which, besides deflection mirrors, comprises at least one lens. Between the objective 20 and the tube lens 28, the light beams are collimated. The lens system consisting of the tube lens 28 and any lens belonging to the scanner 27 and not depicted in FIG. 8A transfers these collimated light beams into collimated light beams whose diameter, depending on the parameters of this lens system, can be varied with regard to the diameter in the back aperture 23. Further, the lens system projects the back aperture 23 into a pupil not depicted in FIG. 8A, which may be located in the scanner 27 and in which a deflection mirror may be placed. The second telescope 12 now serves for adapting the beam diameter to the back aperture 23 or, viewed in opposite direction, for adapting the beam diameter in the back focal plane to the active area 44 of the second wave front modulator. This means that the second telescope 12 serves for adapting the beam diameter which is determined by the back aperture 23 of the objective 20 used, the tube lens 23 and any lens of the scanner 27 and the relative arrangement of these optical components on the output side of the scanner 27, when viewed in detection direction, to the active area 44 of the second wave front modulator 34, and to image the pupil not depicted in FIG. 8A in the pupil plane 30 in which the active area 44 of the second wave front modulator 34 is placed.

In the box of FIG. 8B the dimensions of the pupils 31 and 32 in the embodiment of the fluorescence microscope according to FIG. 8A are depicted schematically. The ratio of the first diameter of the first pupil to the second diameter of the second pupil is about 2:1, here.

Figures 9A, 9B:
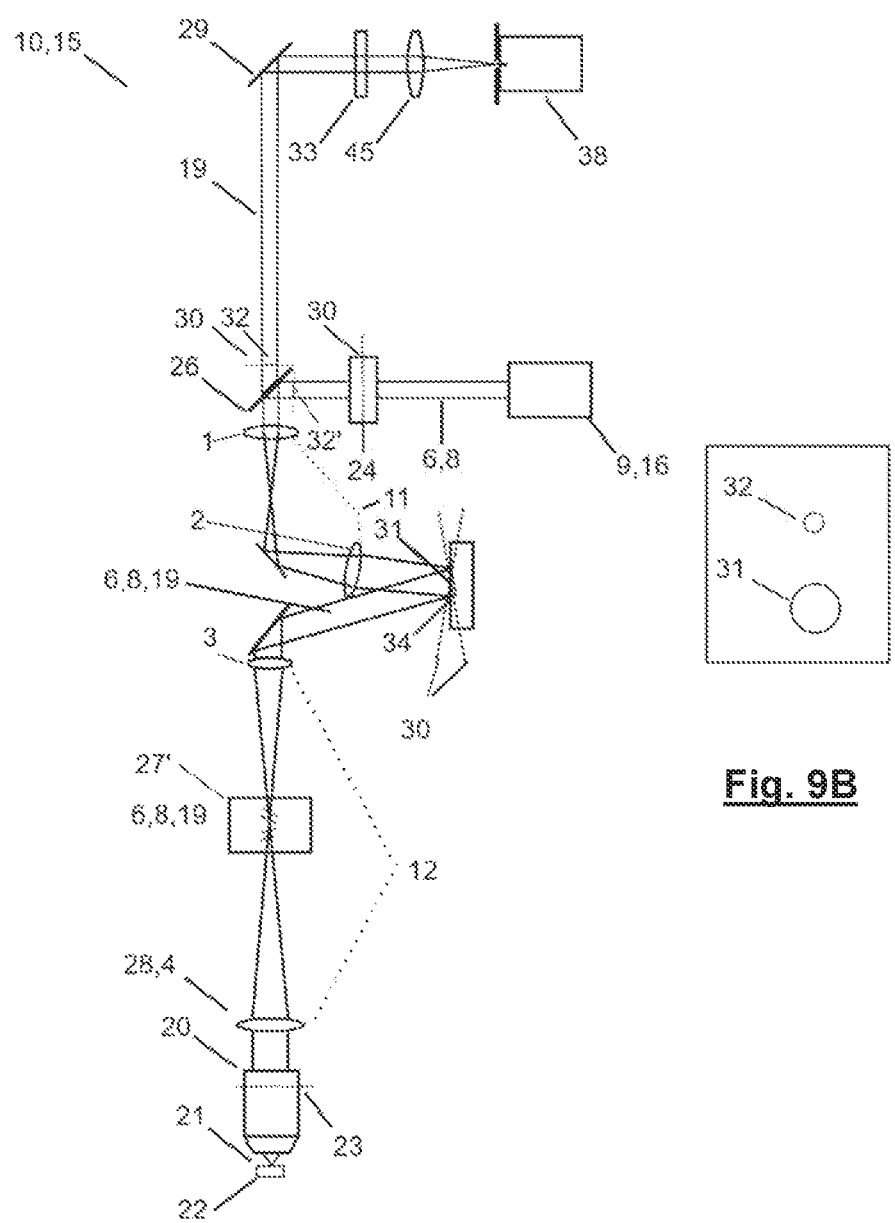
FIGS. 9A and 9B show a further embodiment of the fluorescence microscope of the present disclosure, which is designed as a MINFLUX microscope, and two pupils formed in this fluorescence microscope.

FIG. 9A shows a further laser scanning fluorescence microscope 15 according to the present disclosure which is made as a MINFLUX microscope 70. The MINFLUX microscope 70 comprises a scanner 27' which as such does not comprise a lens but only a special arrangement of deflection mirrors. Together with the lens 3, the scanner 27' forms a unit which corresponds to an embodiment of the scanner 27 depicted in other figures. The functional unit of the scanner 27' and the lens 3 is also designated as a quad-scanner, here. Together with the tube lens 28, the lens 3 assigned to the scanner 27' forms a second telescope 12 which images the back aperture 23 in the pupil plane of the second wave front modulator 34 and which adapts the beam diameter to the active area 44 of the second wave front modulator 34. The tube lens 28 and its distance to the back aperture 23 of the objective 20 are hardly variable in a given microscope. The same applies to a scanner 27 which, when viewed in illumination direction, includes a scanning lens behind the deflection mirrors as it is usual in the prior art. The requirements for the scanning lens in such a setup are extremely high as the beams pass through the scanning lens at strongly varying angles and also at lateral distances to the optical axis. The setup depicted in FIG. 9A has the advantage that all the beams pass through all the lenses on the optical axis and that all the beams pass perpendicularly through all the lens 3. This allows for adapting a microscope setup by suitable selection of the focal length of the lens 3 and corresponding adaptions of the distances to a certain second wave front modulator 34. It is to be indicated that FIG. 9A is also not to scale.

In the box of FIG. 9B the dimensions of the pupils 31 and 32 in the embodiment of the fluorescence microscope according to FIG. 9A are depicted schematically. The ratio of the first diameter of the first pupil to the second diameter of the second pupil is about 2.5:1, here.

A group of components for upgrading a fluorescence microscope which comprises an active wave front modulator 41 in a common beam path for fluorescence light and illumination light is depicted in FIG. 10 together with a scanner 27 including a lens which is not depicted. The group of components is depicted as being arranged on a base plate 60. The description of the group of components is now partially given with reference to its function in its installed state or in the operation of a microscope. In a laser scanning fluorescence microscope 15, the light beams or beam bundles are collimated at the entrance side of the scanner 27. The group of components comprises a first deflection mirror 55 and a second deflection mirror 56. The deflection mirrors 55 and 56 are arranged relative to each other such that points of incidence of the light beams to be deflected are on one optical axis. In the actually depicted embodiment, the deflection mirrors are each oriented at an angle of 45° with regard to the optical axis and thus deflect the light beams by 90°. The group of components further comprises the first telescope 11 including the first lens 1 and the second lens 2, the deformable mirror 51, the second telescope 12 including the third lens 3 and the fourth lens 4, a lens holder 38 in which the lens 2 and the lens 3 are held, and two further deflection mirrors 57. Generally, another active reflective wave front modulator, like, for example, an SLM 61 could be used instead of the deformable mirror 51. However, a deformable mirror 51 is preferred, inter alia because its effect does not depend on the polarization of the light beam to be modulated. The effect of a membrane mirror, for example, does not at all depend on the polarization, and the effect of a mirror comprising an active area made of reflective surfaces of individual actuators does not essentially depend on the polarization, if at all. On the other hand, an SLM 61, 61' only modulates light of one certain polarization. In the beam path of the microscope, intermediate focuses 50 are formed in the group of components at a distance of the focal length f1 behind the first lens and at a distance f4 in front of the fourth lens 4 in illumination direction. In the depicted embodiment, the first lens 1 and the fourth lens 4 have same focal lengths. The same applies to the second lens 2 and the third lens 3. One of the further deflection mirrors 57 deflects the light beam within the first telescope 11 in such a way that it runs at an incident angle δ with regard to the normal to the surface of the deformable mirror 51 towards the deformable mirror 51. In its zero position, the deformable mirror 51 reflects the light beam such that it runs away from the deformable mirror 51 at an equal emergent angle δ and enters into the second telescope 12. Within the second telescope 12 the light beam is deflected once again so that it impinges onto the second deflection mirror 56 as a collimated beam after passing through the fourth lens 4.

In the actual embodiment, the setup is symmetric with regard to the normal to the surface of the deformable mirror 51. A light beam entering the group of components as a collimated light beam of a certain diameter leaves the group of components also as a collimated beam of the same diameter. This also means that this group of components can be integrated in an existing microscope 10 without further alterations being necessary, and that the microscope, if, for example, the deformable mirror 51 has a failure, may be made functional again by removing the first deflection mirror 55 and the second deflection mirror 56, wherein, naturally, the functionality additionally provided by the group of components is no longer existent. If the group of components is completely set up in one plane, only the orientation of the focus image with built-in group of components is reversed as compared to the original orientation, i.e. without the group of components. This may and has to be considered in imaging a sample by scanning it.

Preferably, the group of components is to be built into a fluorescence microscope 10, like, for example, a laser scanning microscope 15, in such a way that the active area 44 of the deformable mirror 51 is located in a pupil plane 30 or intersects such a pupil plane 30. In FIG. 10, it is assumed that, when viewed in illumination direction, a pupil plane 130 in front of the scanner 27 is freely accessible in a microscope which shall be upgraded by means of the group of components. Such a situation is, for example, as a rule given in STED microscopes of the applicant in which so-called quad-scanners are used. With other microscopes in which, when viewed in illumination direction, a scanning lens is arranged behind the scanning mirrors, this situation is given if a relay optics is present in the microscope, which, when viewed in illumination direction, is arranged in front of the scanner and if the one free pupil plane is present in a beam path section in which all beam paths are combined. Such a relay optics is not depicted in FIG. 10. The group of components is constructed such that, a suitable integration provided, the free pupil plane 130 originally present in the microscope is imaged by the deflection mirrors 56, 57 in pupil planes 30 which in turn are imaged by the first telescope 11 and the second telescope 12 each in a pupil plane 30 which intersects the active area 44 of the deformable mirror at a respective angle. If both telescopes, as actually depicted, are identically constructed from two lenses, two of the pupil planes 30 are located at a distance f1=f4 to the first lens 1 and the fourth lens 4, respectively, and the pupil planes, which intersects the active area 44 of the deformable mirror 51 are located at a distance f2=f3 to the second lens 2 and the third lens 3, respectively. In combination with a suitable integration, this setup has the advantageous property that further components of the microscope 10 which have been aligned prior to integrating the group of components or the module with regard to the original pupil plane 130, like for example an SLM 61, 61' for actively forming a light beam of the first illumination light 8 which provides the focus with the central intensity minimum, are, without alterations, also correctly positioned after integration of the group of components or the module.

With regard to the application in an STED microscope it is important that none of the intermediate focuses 50 is located on one of the further deflection mirrors 57 as otherwise, due to the then occurring high STED light intensities, damages or thermally induced deformations may incur there. Thus, the focuses are preferably arranged at a distance at least 20%, further preferred of at least 30%, and even further preferred of at least 40% of the respective focal length of the first lens 1 and the fourth lens 4 to the point of incidence on the respective further deflection mirror 57. This applies to all embodiments of the group of components for STED microscopes with deflection mirrors within a telescope and thus to all fluorescence microscopes 10 according to the present disclosure which are designed as STED microscopes.

Preferably, the angle δ to the normal to the surface of the deformable mirror 51 at which the light beam runs towards and away from the deformable mirror 51 is small, particularly smaller than 45°, preferably smaller than 30°, more preferably smaller than 20°. In the embodiment depicted, the angle δ is about 18°. Small angles δ are advantageous, because the condition that the deformable mirror 51 is completely placed in a pupil plane is approximately fulfilled the better the smaller the angle θ. An angle δ of 0° cannot be achieved, because the light beam would then be reflected onto itself. Smaller angles than 18° may be realized in different ways depending on the building space available.

For example, the further deflection mirrors 57 may be inclined in such a way that the light beams are mirror reflected out of the drawing plane, i.e. out of the plane which is, for example, defined by the tilting axis of the first deflection mirror 55, i.e. the axis about which the first deflection mirror 55 is tilted by 45°, and the point of incidence of the light beam on the first deflection mirror 55. In this way, it can be avoided that the rim of the second lens 2 or its lens holder obstructs the beam path from the first lens 1 to the further deflection mirror 57. Analogous aspects apply to the third lens. It is then possible to shift the second lens 2 and the third lens 3 closely towards each other; correspondingly, the two deflection mirrors 55 and 56 have then to be shifted closely towards each other, and all other distances and angles have to be adapted. Generally, the angle δ is only limited towards smaller values by the minimum achievable distance of the centers of the second lens 2 and the third lens 3 in combination with the focal lengths f2=f3. The angle δ may then, for example, be smaller than 10° or even smaller than 5°. As long as the tilting axis of the first deflection mirror 55 and the second deflection mirror 56 are orthogonal to one and the same plane, the focus image with integrated module is always simply inverted with regard to the focus image without the integrated module which may and has to be considered in imaging a sample in a scanning way or also in tracking movable objects.

Alternatively, the further deflection mirrors 57 may each be arranged within the distance of the focal length f1 of the first lens 1 to the first lens 1 as well as within the distance of the focal length f4 of the fourth lens 4 to the fourth lens 4, wherein the above-mentioned conditions with regard to the distances of the intermediate focuses from the mirrors have also to be considered. The angle δ is then limited in that the beam coming from the first lens has to be reflected such that it does not run through the building space occupied by the first lens 1 and its lens holder, respectively. In such an arrangement, the further deflection mirrors 57 and the active area 44 of the deformable mirror 51 may be arranged on opposite sides of the course of the optical axis of the microscope without the integrated group of components.

A further alternative embodiment can be realized, if the focal lengths of the first lens 1 and the second lens 2 are strongly different. With a symmetric design, this also applies to the third lens 3 and the fourth lens 4. The first telescope 11 and the second telescope 12 then each strongly alter the beam diameter. This makes it possible, to arrange the further deflection mirrors 57 outside the focal lengths f1 and f4 away from the first lens 1 and the fourth lens 4, respectively, but, preferably fulfilling the condition that the deflection mirrors are not located in an intermediate focus 50, so close to an intermediate focus 50 and at such an angle each that the second lens 2 and the third lens 3 depending on angles and positions of the further deflection mirrors 57 get closer to the course of the optical axis of the microscope without the integrated module than the first lens 1 and the third lens 3. Also in such an arrangement, the further deflection mirrors 57 and the active area 44 of the deformable mirror 51 may be located on opposite sides of the course of the optical axis of the microscope which would be given without the module or when the module has been removed. In such an arrangement, the angle δ may for example be smaller than 10° or even smaller than 5°, depending on the exact parameters of the lenses used.

The group of components may be made as a module, for example be arranged on the base plate 60 as depicted. On this base plate 60, the optical elements may be pre-positioned or adjusted relative to each other. Installing the module in the microscope may then take place in a simple way in that the module is placed in the beam path of the microscope. For this purpose, the module, in a preferred embodiment, comprises limitation or abutment elements or a running through limitation or abutment element like a straight elongated edge or abutment edge 64 at a fixed distance to the virtual axis through the points of incidence of the light beams on the first deflection mirror 55 and the second deflection mirror 56. Then, a counter stop or counter abutment element has to be provided in the microscope 10, which extends along the optical axis of the microscope 10 there, where the module is to be integrated. The base plate 60 is preferably configured such that it can be shifted along the counter stop or counter abutment element prior to fixation. This may, for example, be achieved in that the base plate 60 has one or more elongated holes 66 through which the base plate 60 is fixed in the microscope 10 by means of screws. Methods of correctly adjusting the module are known to those skilled in the art.

Alternatively or additionally, all or some of the individual elements of the module may be adjustable after integration in the microscope. Thus, for example, the further deflection mirrors may be fine adjustable in their holders by means of adjusting screws.

A further group of components for upgrading a fluorescence microscope by means of an active wave front modulator in the common beam path for fluorescence light and illumination light is depicted in FIG. 11 together with a tube lens 28. This group of components is also depicted as being arranged on a base plate 60 and forming a module in this way. In contrast to the group of components according to FIG. 10, this group of components is not symmetric with regard to the normal to the surface of the deformable mirror 51. However, even with this non-symmetric design, a collimated light bundle which enters into the group of components at one side will leave it as a collimated light beam at the other side. Also this setup, in combination with a suitable integration, has the advantageous property that further components of the microscope 10, which, prior to integration of the group of components or the module were adjusted with regard to the original pupil plane 130 are still correctly adjusted after integration of the group of components or the module. A particularly benefit of the actual embodiment may be seen in that the building space required along the optical axis of the microscope is reduced such that upgrading of a microscope in which, for example the elements of a beam path for the illumination light 8 are arranged such that a group of components according to FIG. 10 could not be integrated without collision, becomes possible. The group of components comprises the same elements as the group of components according to FIG. 10. In contrast to the group of components according to FIG. 10, the active area 44 of the deformable mirror 51 is tilted by a small angle in such a way that a normal to to the active area 44 is not orthogonal to the direction of the original optical axis of the microscope. The two further deflection mirrors 57 are arranged at different distances to the neighboring lenses 2, 3, respectively, particularly in such a way that the pupil plane 130 gets closer to the first deflection mirror 55 and correspondingly farther away from the second deflection mirror 56. In this way, more space for further elements of the microscope 10 is available along the optical axis on the side of the first deflection mirror 55. If required by the installation situation, the group of components may in an analogue way also be designed such that more building space is available on the side of the tube lens 28 or a scanner 27 (see FIG. 10).

In a further preferred embodiment, the second telescope 12 may in all setups, particularly also in a group of components corresponding to FIG. 11, be made as a special zoom optics which has the property that, independent from its magnification factor, the position of the pupil plane 30 remains the same. Such a zoom optics is for example disclosed in European patent application publication EP 1 617 251 A1 and United States patent application publication US 2006 0 049 343 A1, which belong to the same patent family. According to these patent application publications, the zoom optics may be made of four lens groups which are shiftable with regard to each other. Sourav Pal and Lakshminarayan Hazra "Stabilization of pupils in a zoom lens with two independent movements", Appl. Opt. 52, 5611-5618 (2013) disclose further zoom optics with only three lenses which, at least for several different magnifications, have identical positions of the entrance and exit pupils. The design of the telescope 12 as such a zoom optics has the advantage that the size of the image of the active area 44 of the deformable mirror 51 in the back focal plane may be adapted to the back aperture 23 of different objectives. Vice versa, this means that, even with a change to an objective with a smaller back aperture, the existing deformable surface of the deformable mirror may completely be used as the active area 44.

In an even further preferred embodiment, in all setups, particularly also in a group of components corresponding to FIG. 11, the first telescope 11 may be designed as such a special zoom optics. This allows for integrating a module of a given construction into microscopes of different beam diameters of the illumination light 8. A further advantage becomes relevant, if the deformable mirror 51 shall be replaced by another deformable mirror 51, like for example in case of a damage or simply, because deformable mirrors 51 of a higher quality become available. Then, the deformable mirror may also be replaced, if the replacement mirror has a larger or even a smaller deformable surface than the original mirror. This advantage exists in a same way with a module and with components directly integrated in a microscope 10.

Non-symmetric modules may also be positioned, adjusted and fixed as explained above with reference to the symmetric group of components. With regard to the angle of incidence 6 on the deformable mirror 51 and with regard to the options to further reduce this angle, the same aspects described with reference to the symmetric group of components analogously also apply for the non-symmetric group of components.

If the microscope 10 is an STED microscope, it has to be cared for that any existing further deflection mirror 57 does not get into an intermediate focus even when using a zoom optics as the first telescope 11 or the second telescope 12. However, with using a zoom optics, the position of the deflection mirror may no longer be indicated as a distance to the first lens in relation to its focal length in a sensible way.

In FIG. 12, a group of components or a module is depicted which includes the first wave front modulator 24. The beam path through the two telescopes 11 and 12 and via the deformable mirror 51 is constructed here in such a way that, when viewed in detection direction, the pupil plane 30 following to the first lens 1 of the first telescope 11 is located behind the first deflection mirror 55. In this pupil plane 30, the second beam splitter 26 is placed which separates the detection beam path from the first illumination light 8. By means of a pair of relay lenses 62, 63, this pupil plane is imaged into a further pupil plane 30 in which the active area 44 of the first wave front modulator 24 is placed. The first wave front modulator 24 is here, only as an example, depicted as a transmissive SLM 61', and the first illumination light 8 is here, also only as an example, the excitation light 6 supplied by the excitation light source 16. Both the pair of relay lenses 62, 63 and the first wave front modulator are arranged together with the optical elements known from FIGS. 10 and 11 on the common base plate 60. The arrangement of the second beam splitter 26 in a pupil plane 30 has the advantage, that a tilt of the beam splitter 26 does only result in a tilt of the beam of the first illumination light 8 in the further pupil planes but not in an offset. As, according to the present disclosure, the beam diameter is small at the location of the beam splitter 26, the effect of the tilt on the imaging quality is minimized. All at all, a maximum insensitivity with regard to, for example, thermally-induced maladjustments is achieved. However, the arrangement of the second beam splitter 26 in a pupil plane is not obligatory, i.e. it is not obligatory even in those embodiments of a group of components with an integrated first wave front modulator 24 made as a module. Even if, the distance to a pupil plane 30 is not considered in positioning the beam splitter 26, the effect of the present disclosure is achieved. An arrangement of the beam splitter 26 in or close to a pupil plane results in an additional advantage. Imaging the one pupil plane 30 on the active area 44 of the first wave front modulator is not mandatorily achieved by a pair of relay lenses 62, 63 but it may also be achieved by means of a further telescope. Even if the active area 44 of the first wave front modulator 24, or, if a passive element is arranged here instead, the active area of this passive element shall be effectively used. This means, that the active areas 44 of the first wave front modulator 24 and the second wave front modulator 34 are overall to be imaged onto each other in an as fitting way as possible. It is even more important, that also the active area of the first wave front modulator 24 is imaged into the back aperture 23 of the objective 20 in fitting way.

Many variations and modifications may be made to the preferred embodiments of the invention without departing substantially from the spirit and principles of the invention. All such modifications and variations are intended to be included herein within the scope of the present invention, as defined by the following claims

We claim:
1. A fluorescence microscope comprising
an illumination beam path for illuminating a sample with
illumination light, the illumination beam path including
an illumination light source supplying the illumination
light,
a first wave front modulator for spatially modulating
the illumination light,
a beam splitter,
a second wave front modulator for further spatially
modulating the illumination light, and
an objective,
wherein the first wave front modulator is configured for
modulating the illumination light in such a way that
the modulated illumination light focused by means
of the objective subjects the sample to an intensity
distribution of the illumination light comprising a
central intensity minimum, and
wherein the second wave front modulator is adjustable,
wherein an active area of the second wave front
modulator is
arranged in a pupil plane of the objective or
intersects a pupil plane of the objective at an angle,
wherein a first pupil appears at a location of the
active area of the second wave front modulator,
a detection beam path for confocally detecting luminescence light emitted out of the sample, the detection
beam path comprising a first section and a second
section,
wherein the first section of the detection beam path
including the second wave front modulator and ending at the beam splitter coincides with the illumination beam path, wherein a direction of the detection
beam path is opposite to a direction of the illumination beam path in the first section of the detection
beam path, and
wherein the second section of the detection beam path
beginning at the beam splitter and including a detection unit for confocal detection of the luminescence
light does not coincide with the illumination beam
path, and
a first telescope arranged in the first section between the
second wave front modulator and the beam splitter such
that the first telescope
images the first pupil in the direction of the detection
beam path in a second pupil, the second pupil being
smaller than the first pupil, and
transfers a beam of the illumination light collimated in
the second pupil into an expanded beam of the
illumination light collimated in the first pupil.

2. The fluorescence microscope of claim 1, wherein a ratio of a first diameter of the first pupil to a second diameter of the second pupil is at least 1.2:1.

3. The fluorescence microscope of claim 1, wherein the second wave front modulator is a deformable mirror comprising a deformable membrane, a surface of the deformable membrane being the active area.

4. The fluorescence microscope of claim 1, wherein the first wave front modulator is one of
a non-adjustable passive optical element and
an adjustable active wave front modulator.

5. The fluorescence microscope of claim 1, wherein a second telescope is arranged in the first section between the second wave front modulator and the objective.

6. The fluorescence microscope of claim 1, wherein a scanner is arranged in the first section between the second wave front modulator and a tube lens, the tube lens being arranged between the second wave front modulator and the objective.

7. The fluorescence microscope of claim 6, wherein a second telescope is arranged in the first section between the second wave front modulator and the objective, and wherein the second telescope is arranged between the second wave front modulator and the scanner such as to adapt a beam diameter of the illumination light to a back aperture of the objective.

8. The fluorescence microscope of claim 1, wherein the first telescope and the active area of the second wave front modulator are arranged between a first deflection mirror and a second deflection mirror in the first section, wherein the first deflection mirror and the second deflection mirror are arranged in the illumination beam path and the detection beam path in such a way that, after removing the first and second deflection mirrors from the illumination beam path and the detection beam path, the fluorescence microscope is still operating inclusive of subjecting the sample to the intensity distribution of the illumination light comprising the central intensity minimum.

9. The fluorescence microscope of claim 1, wherein the beam splitter is located at a distance of not more than a focal length of a first lens of the first telescope to the second pupil neighboring the first lens of the first telescope.

10. A group of components for a fluorescence microscope having an objective, the group of components comprising
a supporting structure,
a first telescope including a first lens and a second lens
and delimited by the first lens and the second lens,
a deformable mirror having an active area which, in a
built-in state of the group of components in the fluorescence microscope, is arranged at such a position that
a first pupil of the objective evolves in a plane
in which the active area is arranged or
which the active area intersects at an angle,
wherein the first telescope is configured for imaging the
first pupil in a direction away from the objective in a
second pupil of the objective which is located at a
distance of a focal length of the first lens to the first lens
and outside the first telescope,
wherein the second pupil is smaller than the first pupil,
and
wherein at least one deflection mirror of the group of
components folds a beam path of the group of components, the at least one deflection mirror being arranged
along the beam path within the first telescope in such a
way that it keeps a minimum distance to a focal plane
formed in the first telescope, wherein the minimum
distance is 20% of a shorter one of the focal lengths of
the first lens and the second lens.

11. A group of components for a fluorescence microscope having an objective, the group of components comprising
a supporting structure,
a first telescope including a first lens and a second lens
and delimited by the first lens and the second lens,
a deformable mirror having an active area which, in a
built-in state of the group of components in the fluorescence microscope, is arranged at such a position that
a first pupil of the objective evolves in a plane
in which the active area is arranged or
which the active area intersects at an angle,
a second telescope including a third lens and a fourth lens
and delimited by the third lens and the fourth lens, wherein the first telescope is configured for imaging the first pupil in a direction away from the objective in a second pupil of the objective which is located at a distance of a focal length of the first lens to the first lens and outside the first telescope, wherein the second pupil is smaller than the first pupil, and wherein at least one deflection mirror of the group of components folds a beam path of the group of components, the at least one deflection mirror being arranged along the beam path within the second telescope in such a way that it keeps a minimum distance to a focal plane formed in the second telescope, wherein the minimum distance is 20% of a shorter one of the focal lengths of the third lens and the fourth lens.

12. A group of components for a fluorescence microscope having an objective, the group of components comprising
a supporting structure,
a first telescope including a first lens and a second lens and delimited by the first lens and the second lens,
a deformable mirror having an active area which, in a built-in state of the group of components in the fluorescence microscope, is arranged at such a position that
a first pupil of the objective evolves in a plane
in which the active area is arranged or
which the active area intersects at an angle,
a second telescope including a third lens and a fourth lens and delimited by the third lens and the fourth lens,
wherein the first telescope is configured for imaging the first pupil in a direction away from the objective in a second pupil of the objective which is located at a distance of a focal length of the first lens to the first lens and outside the first telescope,
wherein the second pupil is smaller than the first pupil, and
wherein the group of components, with the deformable mirror being in a zero position, is configured and arrangeable in a beam path of the fluorescence microscope such that the beam path outside the group of components is not altered by the group of components.

13. The group of components of claim 12, wherein a ratio of a first diameter of the first pupil to a second diameter of the second pupil is at least 1.2:1.

14. The group of components of claim 13, wherein the components are combined in a module in that they are adjusted with regard to each other and in that the supporting structure comprises an adjusting device.

15. The group of components of claim 14, further comprising a second telescope including a third lens and a fourth lens and delimited by the third lens and the fourth lens,
wherein at least one deflection mirror of the group of components folds a beam path of the group of components, the at least one deflection mirror being arranged along the beam path within the first telescope in such a way that it keeps a minimum distance to a focal plane formed in the first telescope, wherein the minimum distance is 20% of a shorter one of the focal lengths of the first lens and the second lens, and wherein at least one deflection mirror of the group of components folds a beam path of the group of components, the at least one deflection mirror being arranged along the beam path within the second telescope in such a way that it keeps a minimum distance to a focal plane formed in the second telescope, wherein the minimum distance is 20% of a shorter one of the focal lengths of the third lens and the fourth lens.

16. The group of components of claim 15, further comprising a beam splitter and a wave front modulator.

17. The group of components of claim 12, wherein at least one of the first telescope and the second telescope is made as a zoom optics.

18. A group of components for a fluorescence microscope having an objective, the group of components comprising
a supporting structure,
a first telescope including a first lens and a second lens and delimited by the first lens and the second lens,
a deformable mirror having an active area which, in a built-in state of the group of components in the fluorescence microscope, is arranged at such a position that
a first pupil of the objective evolves in a plane
in which the active area is arranged or
which the active area intersects at an angle,
wherein the first telescope is configured for imaging the first pupil in a direction away from the objective in a second pupil of the objective which is located at a distance of a focal length of the first lens to the first lens and outside the first telescope,
wherein the second pupil is smaller than the first pupil, and
wherein the group of components further comprises a beam splitter and a wave front modulator.

19. The group of components of claim 18, wherein the components are combined in a module in that they are adjusted with regard to each other and in that the supporting structure comprises an adjusting device.

20. A group of components for a fluorescence microscope having an objective, the group of components comprising
a supporting structure,
a first telescope including a first lens and a second lens and delimited by the first lens and the second lens,
a deformable mirror having an active area which, in a built-in state of the group of components in the fluorescence microscope, is arranged at such a position that
a first pupil of the objective evolves in a plane
in which the active area is arranged or
which the active area intersects at an angle,
wherein the first telescope is configured for imaging the first pupil in a direction away from the objective in a second pupil of the objective which is located at a distance of a focal length of the first lens to the first lens and outside the first telescope,
wherein the second pupil is smaller than the first pupil, and
wherein the components are combined in a module in that they are adjusted with regard to each other and in that the supporting structure comprises an adjusting device.

* * * * *